United States Patent
Lotter et al.

(10) Patent No.: US 8,712,396 B2
(45) Date of Patent: *Apr. 29, 2014

(54) MOBILE COMMUNICATION DEVICE MONITORING SYSTEMS AND METHODS

(75) Inventors: Robert A. Lotter, Newport Beach, CA (US); Timothy S. Allard, Sheridan, OR (US)

(73) Assignee: eAgency, Inc., Newport Beach, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/405,907

(22) Filed: Feb. 27, 2012

(65) Prior Publication Data

US 2012/0157039 A1    Jun. 21, 2012

Related U.S. Application Data

(63) Continuation-in-part of application No. 12/014,494, filed on Jan. 15, 2008, now Pat. No. 8,126,456, which is a continuation-in-part of application No. 11/695,500, filed on Apr. 2, 2007, now Pat. No. 7,996,005.

(60) Provisional application No. 60/885,384, filed on Jan. 17, 2007.

(51) Int. Cl.
*H04M 3/00* (2006.01)

(52) U.S. Cl.
USPC ..... 455/419; 455/418; 455/414.1; 455/432.3; 455/412.2; 455/410

(58) Field of Classification Search
CPC ..... H04W 12/00; H04W 12/02; H04W 12/08; H04W 24/08
USPC ............... 455/432.3, 414.1, 418, 419, 404.2, 455/456.1, 410
See application file for complete search history.

(56) References Cited

U.S. PATENT DOCUMENTS

| | | |
|---|---|---|
| 6,282,275 B1 | 8/2001 | Gurbani et al. |
| 6,345,361 B1 | 2/2002 | Jerger et al. |
| 6,785,515 B1 | 8/2004 | Sommer et al. |
| 6,959,182 B2 | 10/2005 | Lingafeldt et al. |
| 7,024,548 B1 * | 4/2006 | O'Toole, Jr. ............. 713/1 |
| 7,046,782 B2 | 5/2006 | Miller |
| 7,076,041 B2 | 7/2006 | Brown et al. |
| 7,139,553 B2 | 11/2006 | Alston |
| 7,231,218 B2 | 6/2007 | Diacakis et al. |
| 7,257,228 B2 | 8/2007 | Wheeler et al. |
| 7,327,837 B1 | 2/2008 | Harlow et al. |
| 7,418,089 B2 * | 8/2008 | Tiliks et al. ............. 379/196 |
| 7,543,051 B2 * | 6/2009 | Greifeneder et al. ......... 709/224 |
| 7,570,943 B2 | 8/2009 | Sorvari et al. |

(Continued)

*Primary Examiner* — Kashif Siddiqui
*Assistant Examiner* — Mong-Thuy Tran
(74) *Attorney, Agent, or Firm* — Haynes and Boone, LLP

(57) ABSTRACT

Systems and methods are directed to monitoring the communications to and from a mobile communication device in accordance with one or more embodiments. For example in accordance with an embodiment, each of the data services on a mobile communication device may be monitored against rules stored in a central data center repository. The data services may include all forms of communications between the mobile communication device and a third party along with changes to application or data within the mobile communication device. An alert may be provided to an administrator when unauthorized data service activity and/or a message may be sent to the mobile communication device to prevent the unauthorized data service activity.

23 Claims, 29 Drawing Sheets

(56) References Cited

U.S. PATENT DOCUMENTS

| | | | |
|---|---|---|---|
| 7,684,792 B2* | 3/2010 | Lundblade et al. | 455/425 |
| 7,738,646 B2* | 6/2010 | Sundaram et al. | 379/220.01 |
| 7,814,163 B2 | 10/2010 | Lee et al. | |
| 7,984,074 B1* | 7/2011 | Becher et al. | 707/802 |
| 8,027,448 B2 | 9/2011 | Jorasch et al. | |
| 8,045,958 B2* | 10/2011 | Kahandaliyanage | 455/410 |
| 8,266,676 B2* | 9/2012 | Hardjono et al. | 726/3 |
| 2002/0021791 A1* | 2/2002 | Heilmann et al. | 379/189 |
| 2002/0067821 A1* | 6/2002 | Benson et al. | 379/265.02 |
| 2002/0143934 A1 | 10/2002 | Barker et al. | |
| 2003/0076941 A1* | 4/2003 | Tiliks et al. | 379/196 |
| 2004/0132436 A1* | 7/2004 | Dupont et al. | 455/414.1 |
| 2004/0208304 A1 | 10/2004 | Miller | |
| 2005/0003804 A1* | 1/2005 | Huomo et al. | 455/414.1 |
| 2005/0086255 A1 | 4/2005 | Schran et al. | |
| 2005/0113113 A1 | 5/2005 | Reed | |
| 2005/0154688 A1* | 7/2005 | Bolt et al. | 706/14 |
| 2005/0188079 A1* | 8/2005 | Motsinger et al. | 709/224 |
| 2005/0282559 A1 | 12/2005 | Erskine et al. | |
| 2006/0080321 A1* | 4/2006 | Horn et al. | 707/10 |
| 2006/0114832 A1* | 6/2006 | Hamilton et al. | 370/244 |
| 2006/0181411 A1 | 8/2006 | Fast et al. | |
| 2006/0190473 A1 | 8/2006 | Ovsyannikov et al. | |
| 2006/0209809 A1 | 9/2006 | Ellingham et al. | |
| 2007/0026842 A1* | 2/2007 | Haave et al. | 455/404.2 |
| 2007/0192865 A1* | 8/2007 | Mackin | 726/24 |
| 2007/0214088 A1* | 9/2007 | Graham et al. | 705/51 |
| 2008/0009268 A1 | 1/2008 | Ramer et al. | |
| 2008/0064381 A1* | 3/2008 | Ackley | 455/417 |
| 2008/0112332 A1* | 5/2008 | Pepper | 370/250 |
| 2008/0134282 A1 | 6/2008 | Fridman et al. | |
| 2008/0147452 A1* | 6/2008 | Renz et al. | 705/7 |
| 2008/0168135 A1 | 7/2008 | Redlich et al. | |
| 2008/0201311 A1* | 8/2008 | Ertugrul et al. | 707/4 |
| 2009/0132718 A1 | 5/2009 | Groll et al. | |
| 2009/0254993 A1* | 10/2009 | Leone | 726/25 |

* cited by examiner

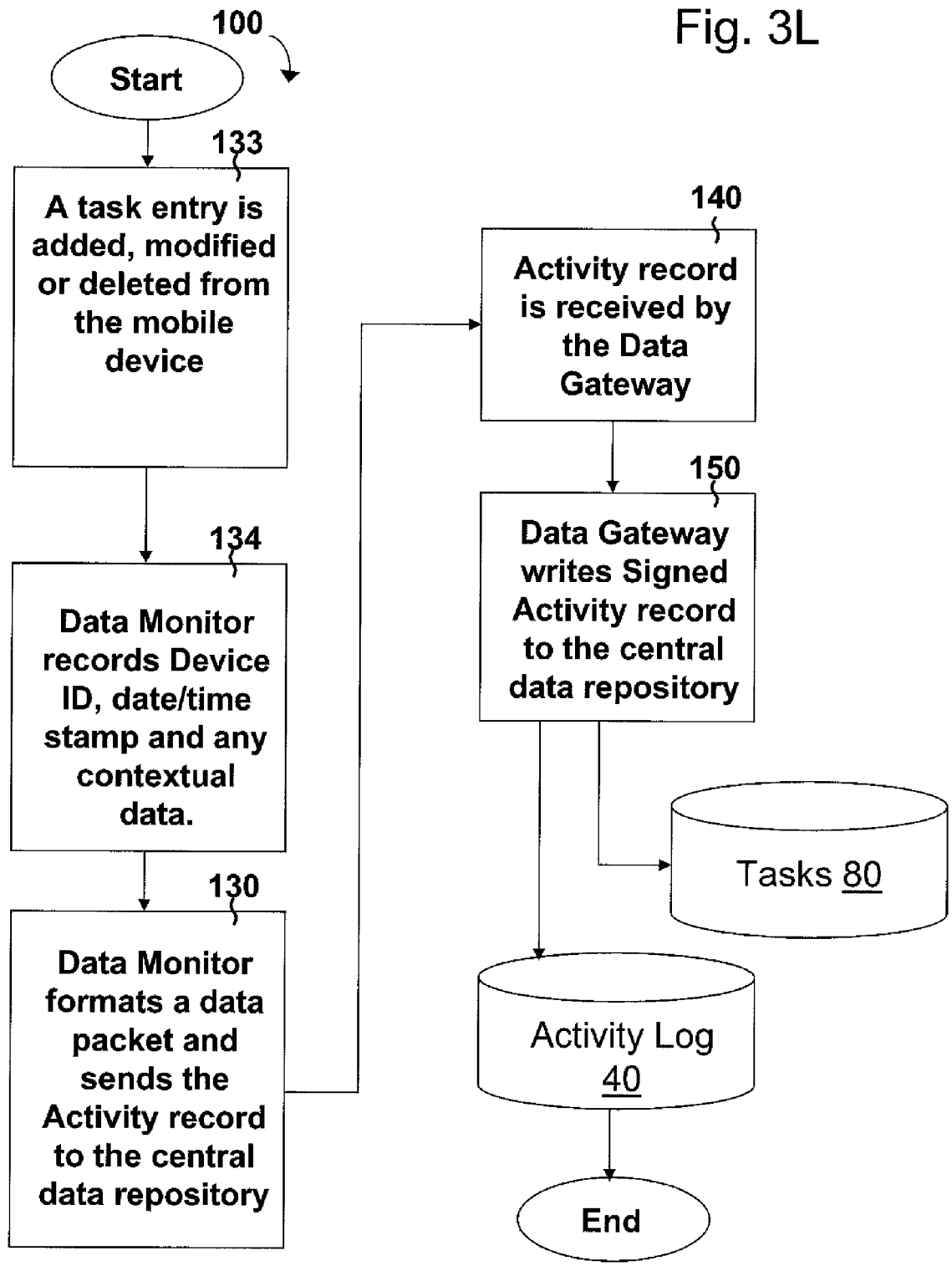

Fig. 4A

Activity Log 40

| Record ID | Acct ID | Msg Type | In/Out | Start Time | End Time | CallerID | Log |
|---|---|---|---|---|---|---|---|
| 100 | 200 | Email | In | 23:51:01 1/1/2007 | | buddy@abc.com | Did you find... |
| 101 | 200 | Phone | Out | 22:42:01 1/1/2007 | 22:45:56 1/1/2007 | 213-555-1212 | |
| 102 | 201 | SMS | In | 22:35:26 1/1/2007 | | 909-123-1234 | Meet me at 4... |
| 103 | 200 | Email | Out | 18:15:21 1/1/2007 | | john@acme.com | Want a better... |
| 104 | 202 | IM | Out | 16:12:09 1/1/2007 | | mypal12 | Hey John... |
| 105 | 202 | Phone | In | 14:20:12 1/1/2007 | 14:36:41 1/1/2007 | 605-852-9797 | |
| 106 | 203 | Email | In | 10:51:32 1/1/2007 | | alice@mx.com | Thanks for calling... |

Fig. 4B

Activity Log 40

| Record ID | Long | Lat | CRC | Auth | Auth ID | Carrier Log Auth |
|---|---|---|---|---|---|---|
| 100 | 33.6235 | 117.8644 | 132132 | Bio | 1101 | N/A |
| 101 | 58.1254 | 111.2154 | 321354 | Password | 1110 | ATT 1235468 |
| 102 | 14.2135 | 25.6448 | 31654 | N/A | N/A | Verizon 123546 |
| 103 | 94.6548 | 96.3215 | 65465496 | Password | 1101 | Rogers 2165468 |
| 104 | 15.1245 | 11.2154 | 2135468 | Bio | 1221 | N/A |
| 105 | 13.2154 | 52.3164 | 3213546 | Bio | 1385 | Sprint 54687978 |
| 106 | 23.1524 | 94.2546 | 032165 | Bio | 2546 | AllTel 24657685 |

Fig. 5

Permissions 50

| Record ID | Acct ID | Data Service | Allow | Deny | Alert Type | Alert Number |
|---|---|---|---|---|---|---|
| 100 | 200 | Email | True | False | Email | alice@acme.com |
| 101 | 200 | Phone | True | False | SMS | 909-123-1234 |
| 102 | 200 | SMS | False | True | Email | alice@acme.com |
| 103 | 201 | Email | True | False | Email | joe@abc.com |
| 104 | 201 | Email | True | False | SMS | 605-852-9797 |
| 105 | 201 | IM | True | False | SMS | 605-852-9797 |
| 106 | 201 | SMS | True | False | Email | john@mx.com |

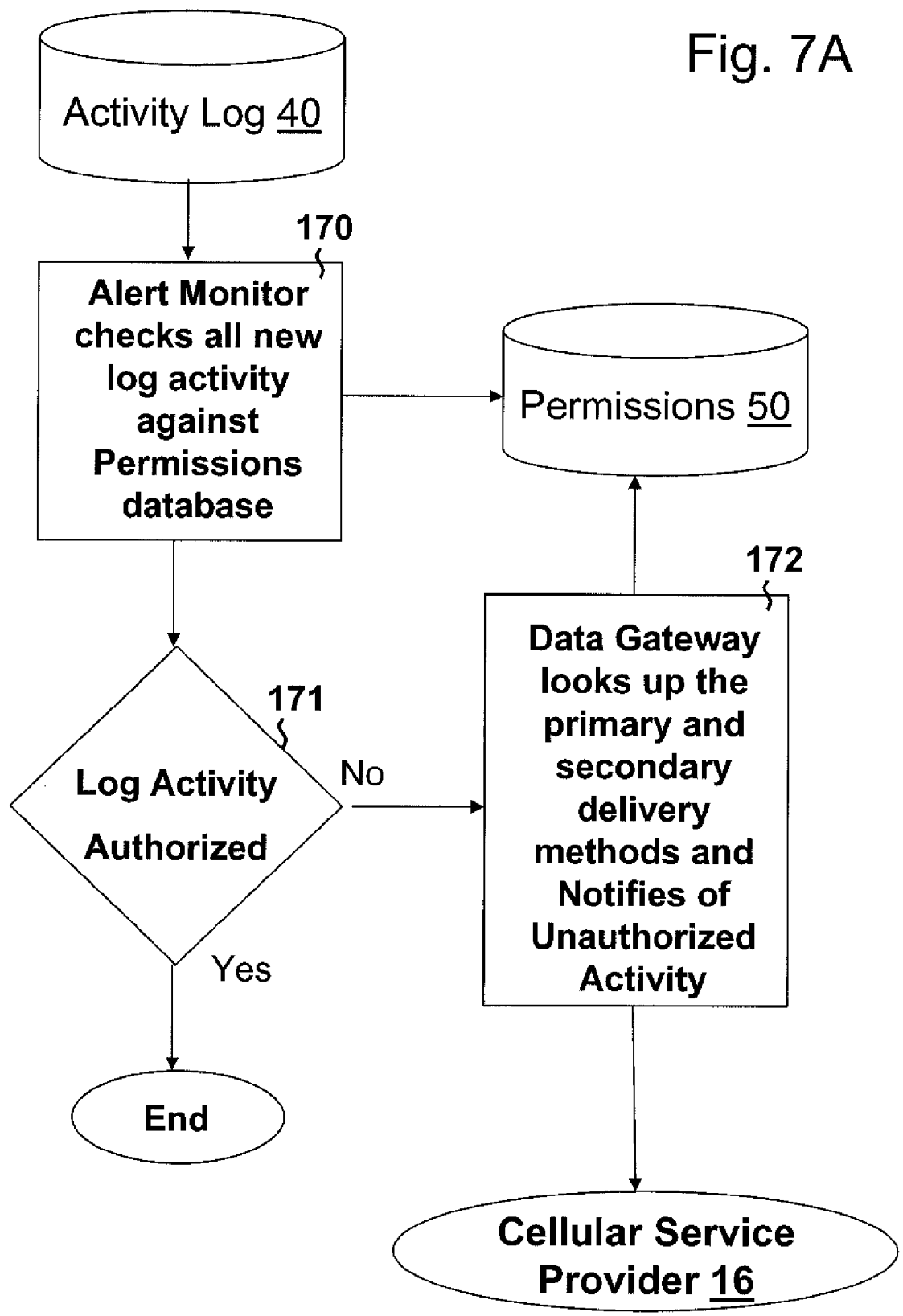

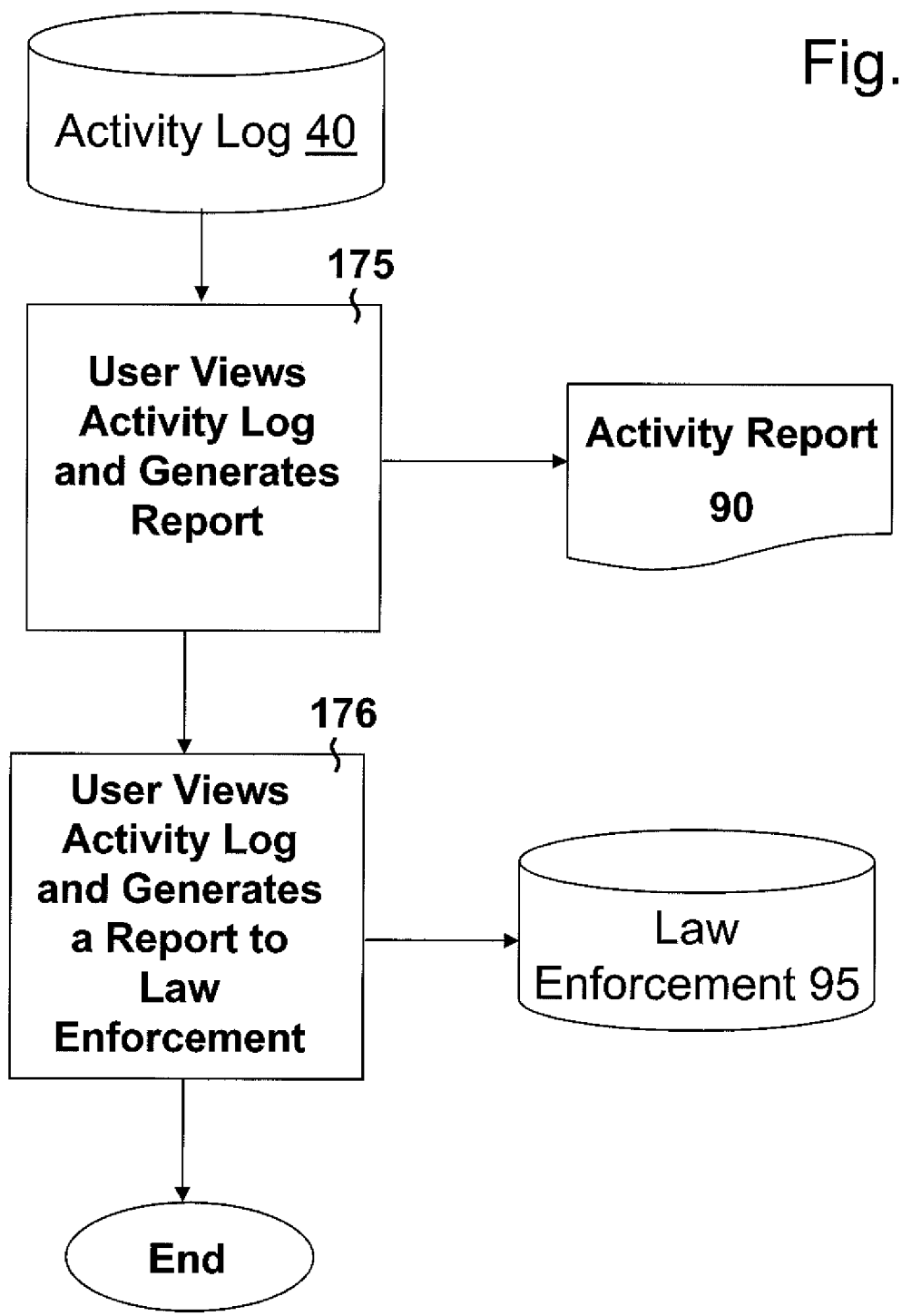

MOBILE COMMUNICATION DEVICE MONITORING SYSTEMS AND METHODS

CROSS-REFERENCE TO RELATED APPLICATIONS

This Continuation-In-Part Patent Application claims priority to and the benefit of U.S. patent application Ser. No. 12/014,494 filed Jan. 15, 2008, which is a Continuation-In-Part Patent Application claiming priority to and the benefit of U.S. patent application Ser. No. 11/695,500 filed Apr. 2, 2007, both of which claim priority to and the benefit of U.S. Provisional Patent Application No. 60/885,384 filed Jan. 17, 2007, which are all incorporated herein by reference in their entirety.

TECHNICAL FIELD

The present invention relates generally to communication systems and, more particularly, to mobile communication devices and systems and methods for monitoring the communication devices.

BACKGROUND

A 2006 report from the National Center for Missing and Exploited Children (NCMEC) showed that more parents and guardians were using filtering, blocking, and monitoring software on the home computers that their children used most often, but even so, youth exposure to unwanted sexual material increased substantially from the report conducted five years earlier. In the study, thirty four percent of the youth communicated with people online that they did not know. One in seven received unwanted sexual solicitations or approaches in the past year, while fifty six percent of the youths who received an unwanted solicitation did not report the incident to anyone. Almost one third (approximately thirty one percent) of the solicitations were aggressive, meaning the solicitors made or attempted to contact the youth offline, and of the aggressive solicitations, thirty four percent called the youth on the telephone.

The report recommended broader efforts to reduce the risks to youth, but the recommendations were still directed mainly to limiting Internet access from within the home. However, approximately twenty five percent of all teens and pre-teens in the U.S. carry a cell phone and this number is expected to grow significantly over the next several years. All of the Internet services, such as email, instant messaging, text messaging, etc., mentioned in the NCMEC study, are also available on the child's cell phone. In addition, the child is more likely to assume his cell phone activities are private when away from the monitoring software installed on the home computer. Currently, there is no means for parents to monitor their child's Internet and cell phone activities outside of the home.

As a result there is a need for systems and methods that allow parents, guardians, and/or employers to effectively monitor these activities as well as provide additional security, location tracking, and/or prosecution, for example, against unlawful predator activities or other undesirable activities.

SUMMARY

Systems, methods, and program products are disclosed, in accordance with one or more embodiments of the present invention, which are directed to monitoring the communications to and from a wireless data device. For example in accordance with an embodiment, each of the data services on a wireless device, such as a cell phone, a Smartphone, or a personal digital assistant (PDA), may be monitored against the permissions (e.g., rules) stored in a central repository. Data services may include all forms of communications between the device and a third party including, for example, cellular voice calls, short message service (SMS) text messages, email, instant messaging sessions, and/or the applications used by the data services including, for example, the address book, calendar, and tasks maintained on the wireless device. In accordance with some embodiments, monitoring may be performed for a multitude of communication protocols for sending or receiving data including, for example, protocols associated with cellular networks, personal identification number (PIN)-to-PIN messaging, Wi-Fi standards, Bluetooth standards, Personal Area Networks, Local Area Networks, and/or Public Networks.

According to some embodiments of the present invention, a user may specify the permissions for each data service associated with a wireless device. The user may specify whether use of the service is allowed or denied for any identity that is not currently in the address book of the device. In addition to the forensic information collected and stored regarding the communication transaction, an embodiment of the present invention collects, stores, and analyzes the contextual information contained within the data including text, files, pictures, audio, and/or all other manner of digital and analog content transmitted between a mobile communications device and a third party.

In accordance with some embodiments of the present invention, systems, methods, and program products are disclosed that alerts the user whenever an unauthorized activity is detected. For example, the user may specify one or more methods of notification including email, SMS text message, voice call, and/or any other publicly accepted machine-to-machine communications protocol to alert the user whenever an unauthorized activity is detected. In general in accordance with some embodiments, the type of unauthorized activity being monitored may include any form of information transmission and/or reception (e.g., of audio, photo, video, textual data, or multimedia information) or any type of change to the wireless data device. Similarly in accordance with some embodiments, the user notification of unauthorized activity may be provided in any form of communication, including for example audio, photo, video, textual data, and/or multimedia information.

More specifically in accordance with one or more embodiments of the present invention, a client application installed on a mobile communications device, such as for example a cell phone or PDA, transmits detailed device usage information using a wireless data connection from the device to a central repository accessible from a network (e.g., the Internet). For example, monitoring of device usage may include such things as inbound or outbound phone calls, inbound or outbound SMS Text Messages, inbound or outbound Instant Messages, Web Browser Access, Address Book changes (e.g., Adds, Modifications, and/or Deletions), Calendar Appointment changes (e.g., Adds, Modifications, and/or Deletions), Tasks changes (e.g., Adds, Modifications, and/or Deletions), changes to the installed applications on the device (e.g., Adds, Modifications, and/or Deletions), and/or inbound or outbound multimedia files.

In addition to the client application in accordance with one or more embodiments of the present invention, a web-based monitoring application, which is controlled by an administrative user such as for example a parent or manager, monitors the contents of the central repository. For example, based on rules selected by the administrative user, the device usage is allowed, denied, and/or an alert is sent to the administrative user notifying them of an unauthorized event. In accordance with some embodiments of the present invention, existing location services (e.g., GPS, cell-based location applications, or network-based location applications) may be employed to include the monitoring and alerting of the physical location of the device. Furthermore in accordance with some embodiments, the information stored in the central repository may be signed and/or encrypted to provide secure storage and authentication, such as for chain of custody or other evidentiary reasons.

In accordance with one embodiment of the present invention, a system includes memory configured to store programs and database information; a processor, coupled to the memory, configured to access the database information and run the programs; and a communication gateway, coupled to the processor and the memory, configured to receive information on data service use from a mobile, wireless, communication device being monitored by the system. The database information may include an activity log database configured to store a signed entry for each data service use received from the mobile, wireless, communication device; and a permissions database configured to store rules as to whether the data service use is allowed for the mobile, wireless, communication device. The programs may include an alert monitor program configured to compare the signed entry for each of the data service uses stored in the activity log database to the rules stored in the permissions database and provide an alert if the data service use of the mobile, wireless, communication device is not allowed.

In accordance with another embodiment of the present invention, a mobile communications device includes a memory configured to store programs and data; a processor, coupled to the memory, configured to run the programs stored in the memory; a communications port configured to wirelessly communicate with a data center; and wherein the programs include a data monitor program configured to monitor data service uses of the mobile communications device and compile signed information of the data service uses for transmission to the data center via the communications port, wherein the data service uses comprise inbound and outbound activity between the mobile communications device and a third party and changes to the data stored in the memory.

In accordance with another embodiment of the present invention, a method of monitoring a mobile communication device includes storing rules associated with data service uses for the mobile communication device; receiving information for one of the data service uses from the mobile communication device; signing the information; storing the signed information for the data service use; checking the data service use to the corresponding rule associated with the data service use; and providing an alert if the data service use is unauthorized based on the corresponding rule.

In accordance with another embodiment of the present invention, a method of monitoring a mobile communication device includes monitoring data service uses of the mobile communication device; compiling information of one of the data service uses; and transmitting the information of the data service use to a data center to sign and store the information, wherein the data service uses comprise inbound and outbound activity between the mobile communications device and a third party and changes to data stored in the mobile communication device.

In accordance with another embodiment of the present invention, a computer-readable medium is disclosed on which is stored a computer program for performing a method of monitoring a mobile communication device, the method includes storing rules associated with data service uses for the mobile communication device; receiving information for one of the data service uses from the mobile communication device; storing the information with a signature for the data service use; checking the data service use to the corresponding rule associated with the data service use; and providing an alert if the data service use is unauthorized based on the corresponding rule.

In accordance with another embodiment of the present invention, a computer-readable medium is disclosed on which is stored a computer program for performing a method of monitoring a mobile communication device, the method includes monitoring data service uses of the mobile communication device; compiling information of one of the data service uses; and transmitting the information of the data service use to a data center to store with a digital signature, wherein the data service uses comprise inbound and outbound activity between the mobile communications device and a third party and changes to data stored in the mobile communication device.

In accordance with another embodiment of the present invention, a system includes a service provider configured to provide a network to support communications for a plurality of mobile communications devices; and a network data monitor associated with the service provider and configured to monitor communications of the plurality of mobile communications devices communicating through the service provider and generate monitoring information to provide to a data center, the monitoring information including information on data services uses of the mobile communications devices. The data services uses, for data services associated with each mobile communications device, include inbound and outbound communications of the mobile communications device; any additions, modifications, and/or deletions within the mobile communication device of applications; and any additions, modifications, and/or deletions within the mobile communication device to application data. The data services uses may further include any attempt by an application to access privileged user information within the mobile communications device.

In accordance with another embodiment of the present invention, a system includes a data center having a memory configured to store programs and database information; a processor, coupled to the memory, configured to access the database information and run the programs; a communication gateway, coupled to the processor, configured via a service provider to receive information, including contextual information, on data services uses of mobile communications devices, being monitored by the data center. The service provider includes a network data monitor configured to monitor each data service use for each mobile communications device; compile the monitoring information associated with each data service use for each mobile communications device; and provide the monitoring information associated with each data service use for each mobile communications device to be received by the communication gateway. The data services uses, for data services associated with the mobile communications device, include inbound and outbound communications of the mobile communications device; and any addition, modification, and/or deletion within the mobile communications device to application data, wherein the information associated with the data services uses comprise message information for a message application data service use, including at least one of associated originating or destination email address, username, or telephone number along with contextual data. The data base information includes an activity log database configured to store an entry for each data service use based on the monitoring information, including contextual information, received from the mobile communications device; and a permissions database configured to store rules as to whether each data service use is allowed for the mobile communications device. The programs may include an alert monitor program configured to compare the entry for each data service use stored in the activity log database to the associated rule stored in the permissions database and to provide an alert if the data service use of the mobile communications device is not allowed.

In accordance with another embodiment of the present invention, a mobile communications device includes a first memory configured to store mobile programs and mobile data; a first processor, coupled to the first memory, configured to run the mobile programs stored in the first memory; and a first communications port configured to wirelessly communicate with a data center via a service provider. The mobile programs include a data monitor program configured to monitor data services uses of the mobile communications device; compile information, including contextual information, of the data services uses; and transmit the information to the data center via the communications port and the service provider. The information includes an address book information for an address book application data service use, including date/time stamp and contextual data associated with the address book addition, modification, and/or deletion; calendar information for a calendar application data service use, including date/time stamp and contextual data associated with the calendar addition, modification, and/or deletion; and/or task information for a task application data service use, including date/time stamp and contextual data associated with the task addition, modification, and/or deletion.

In accordance with another embodiment of the present invention, a method, of monitoring a mobile communications device communicating via a service provider, includes storing rules associated with data services uses for the mobile communications device at a data center, wherein the data services uses, for data services associated with the mobile communications device, include inbound and outbound communications of the mobile communications device; any additions, modifications, and/or deletions within the mobile communications device to applications; and any additions, modifications, and/or deletions within the mobile communications device to application data. The method further includes receiving monitoring information, including the corresponding contextual information, for one of the data services uses of the mobile communications device, the monitoring information generated by a network data monitor associated with the service provider; storing the monitoring information for the data service use; checking the data service use based on the monitoring information to the corresponding rule associated with the data service use; and providing an alert if the data service use is unauthorized based on the corresponding rule.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 4A-4B illustrate an exemplary table representation of the Activity Log database of FIG. 1 in accordance with an embodiment of the present invention.

FIG. 5 is an exemplary table representation of the Permissions database of FIG. 1 in accordance with an embodiment of the present invention.

FIGS. 7A-7B illustrate exemplary flowcharts of the Alert Monitor tool of FIG. 1 in accordance with an embodiment of the present invention.

FIG. 8 illustrates an exemplary flowchart of a reporting process in accordance with an embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
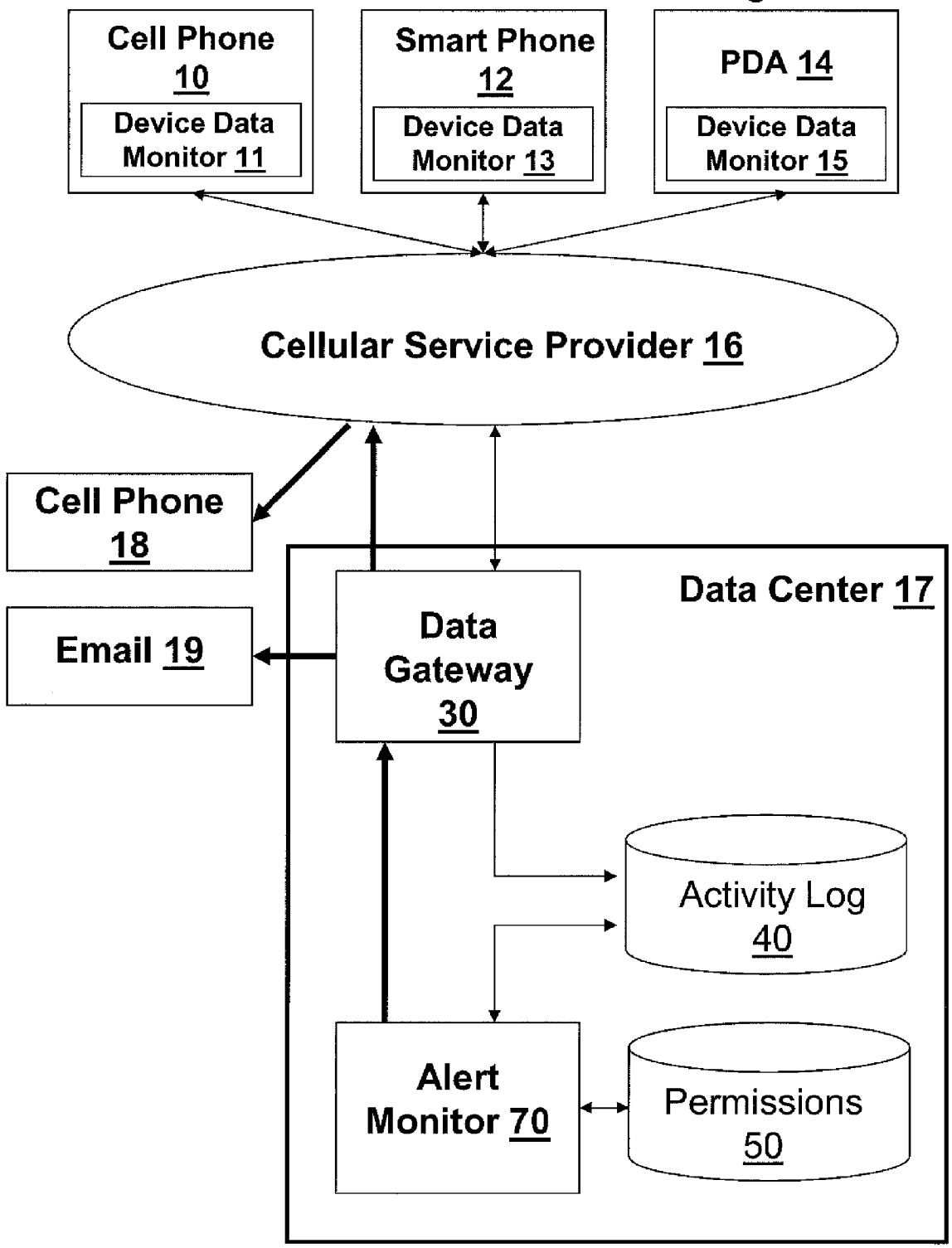
FIG. 1 is a block diagram of a system including a Data Monitor tool to monitor the activities on a wireless device, a Data Gateway for collecting the activity on a wireless device, and an Alert Monitor in accordance with an embodiment of the present invention.

FIG. 1 illustrates a Data Gateway program tool 30 and wireless devices 10, 12, and 14 represent users whose activities are monitored according to an embodiment of the present invention. Each of the devices 10, 12, and 14 may include a respective Data Monitoring program tool 11, 13, and 15 which communicates with the Data Gateway 30. For example, wireless devices 10, 12, and 14 include memory and a processor configured to run various programs (e.g., software applications) stored in the memory, including respective Data Monitoring program tools 11, 13, and 15.

Data services used on the wireless devices 10, 12, and 14 are monitored for activity by their respective Data Monitoring program tool 11, 13, and 15 which communicates (e.g., via a communication port such as through a wireless communication gateway having an antenna) to the Data Gateway 30 via a wireless data connection such as provided by a Cellular Service Provider 16. Alternatively, the devices 10, 12, and 14 may send their activity information through any available communications network (e.g., any standards or protocols)

including for example PIN-to-PIN, Wi-Fi, Bluetooth, Personal Area Networks, Local Area Networks, and/or Public Networks (e.g., cellular networks, satellite networks, and/or the Internet).

As described in more detail below, the Data Gateway 30 maintains an Activity Log 40 database in a Data Center 17. Activity Log 40 contains an entry for each use of a data service on wireless devices 10, 12, and 14. As described in more detail below, Data Center 17 also contains a Permissions 50 database that lists the wireless devices to be monitored (e.g., wireless devices 10, 12, and 14) and the rules to apply to allow, deny, and/or alert of data service activity occurring on the wireless devices being monitored.

An Alert Monitor 70 program waits for new entries to be made into Activity Log 40. Each new entry is checked against the Permissions 50 database. Whenever unauthorized activity is detected, Alert Monitor 70 sends an alert to one or more users via Data Gateway 30, such as for example to a cell phone 18 using SMS Text Messaging or an Email 19 account. The preferred method of notification may be maintained in the Permissions 50 database which can support many forms of data communications including voice messages, SMS Text Messages, email, and/or any other publicly accepted machine-to-machine communications protocol.

Data Gateway 30 and Alert Monitor 70, in accordance with one or more embodiments of the present invention, may represent one or more computers (e.g., servers or other processor-based systems) for performing the operations described herein (e.g., by executing software and communicating through a gateway or other communication interface), including communicating with Activity Log 40 and Permissions 50 databases (e.g., memory such as server-based storage). Data Monitoring program tools 11, 13, and 15 may represent, for example, software run by corresponding processors of wireless devices 10, 12, and 14 or may represent hardware-based systems (e.g., separate processors) for performing the desired operations described herein.

Furthermore, the various programs or system elements may be combined or be discreet, as desired for the specific application. For example, Data Gateway 30 and Alert Monitor 70 may represent one computer or software program or separate computers and software programs for performing the various functions disclosed herein. Similarly for example, Activity Log 40 and Permissions 50 databases may represent one memory or discrete memory for storing the information disclosed herein. Additionally, the various programs may be stored on a computer-readable medium that may be programmed or loaded into a particular device. For example, data monitor 11 may be a software program stored on a computer-readable medium or otherwise provided to and programmed into wireless device 10 to perform the desired functions as described herein.

Figure 2:
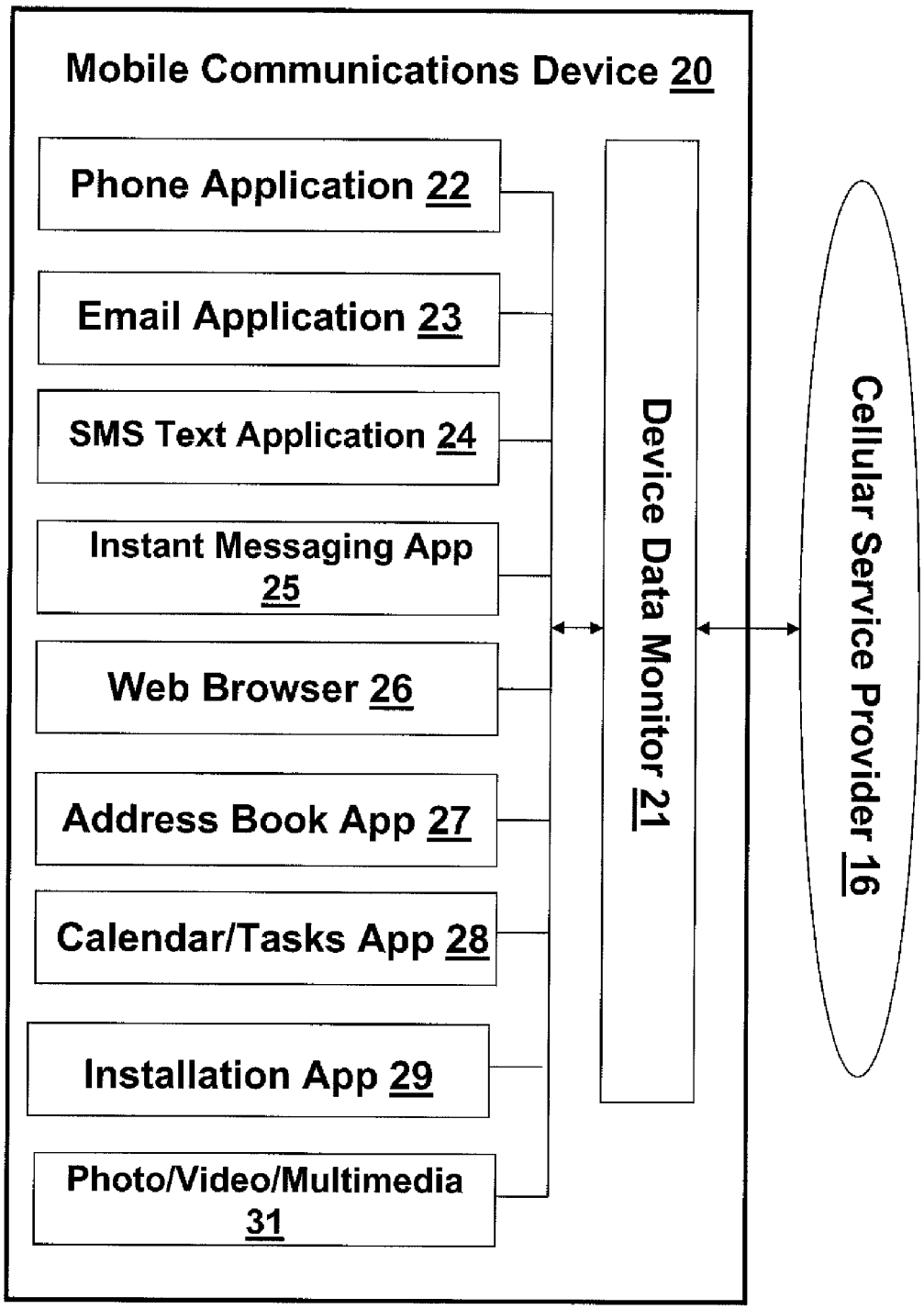
FIG. 2 is a block diagram of a system including a monitoring tool associated with a mobile communications device in accordance with an embodiment of the present invention.

FIG. 2 illustrates in more detail a Data Monitor 21 program tool which captures the data service activity on a Mobile Communications Device 20 in accordance with an embodiment of the present invention. For example, data monitor 21 program tool may be an exemplary representation of data monitor 11, 13, or 15 and similarly mobile communications device 20 may be an exemplary representation of device 10, 12, or 14. Each Mobile Communications Device 20 contains one or more applications that may use a communication protocol (e.g., a conventional communication protocol) to send or receive information (e.g., digital data packets or other forms of communications) or provide supporting applications to facilitate the communications process (e.g., an Address Book which contains an email address used to send an email communication).

In accordance with an embodiment of the present invention, these communication applications and their supporting applications may be referred to as a data service. These data services may include one or more of a Phone Application 22 for sending or receiving voice communications, an Email Application 23 for sending or receiving email communications, a SMS Text Application 24 for sending or receiving SMS text messages, an Instant Messaging Application 25 for sending or receiving instant messages, a Web Browser Application 26 for sending or receiving HTTP requests and responses, an Address Book Application 27 for storing contact information, a Calendar/Task Application 28 for storing appointment information, an Installation Application 29 for storing information regarding the installed applications on the device, and/or a Photo/Video/Multimedia Application 31 for sending or receiving multimedia files.

As described in more detail below, Data Monitor 21 program tool monitors the inbound and outbound activity for each of these data services and sends a detailed log of these activities to a central repository using Cellular Service Provider 16. Alternatively, Data Monitor 21 program tool may send the activity information through any available communications network, such as for example the Internet, a company network, and/or a public cellular network.

As would be understood by one skilled in the art, embodiments of the present invention provide certain advantages over conventional approaches. For example, a conventional approach may simply provide parental controls which monitor and block Internet and email access from a desktop and which primarily prevent access to unwanted content or block the transmission of personally identifiable information. Blocking usually results in the child finding an unmonitored computer to access the blocked content. For example, most gaming consoles today are enabled with Internet access and do not inherently include parental controls. Parental control applications generally do not log the blocked content and none pro-actively notify the parent or administrative user of the event. Additionally, none are capable of monitoring a cell phone or other mobile communications device which today have comparable communication capabilities as a desktop computer.

As another example of a conventional approach, child and employee monitoring of geographic location may be provided from a cell phone, but this approach typically requires an active search by the parent or manager to locate the device. Perimeter boundaries or virtual fencing could be deployed using existing location technology, but again all of these location approaches are after-the-fact of direct contact with a predator or after a potentially life threatening event is in progress.

In contrast in accordance with one or more embodiments of the present invention, systems and methods are disclosed for example to detect the potentially life threatening event before physical contact is made with the user of a monitored wireless device. As an example, Mobile Communications Device 20 may include a GPS-based or other type of location-determination application (e.g., as part of phone application 22 or Data Monitor 21) that periodically or continuously determines the location of Mobile Communications Device 20, with this location information provided to Data Center 17 (e.g., stored in Activity Log 40) via Data Monitor 21 with an optional alert provided to an administrator (e.g., parent) based on location parameter settings (e.g., virtual fence). For example, the GPS information may be provided by Data Monitor 21 to Data Center 17, where it is stored in activity log 40, and an alert provided to the administrator if the Mobile Communications Device 20 enters a restricted area or proceeds outside of a defined geographic region. In general, Data Monitor 21 provides various information to Data Center 17 to permit an administrator (e.g., parent or manager) to monitor the activities (e.g., location, communications with a third party, and/or changes to applications or other data within Mobile Communications Device 20) of a user of Mobile Communications Device 20, with an optional alert provided to the administrator if an unauthorized activity occurs.

Figure 3A:
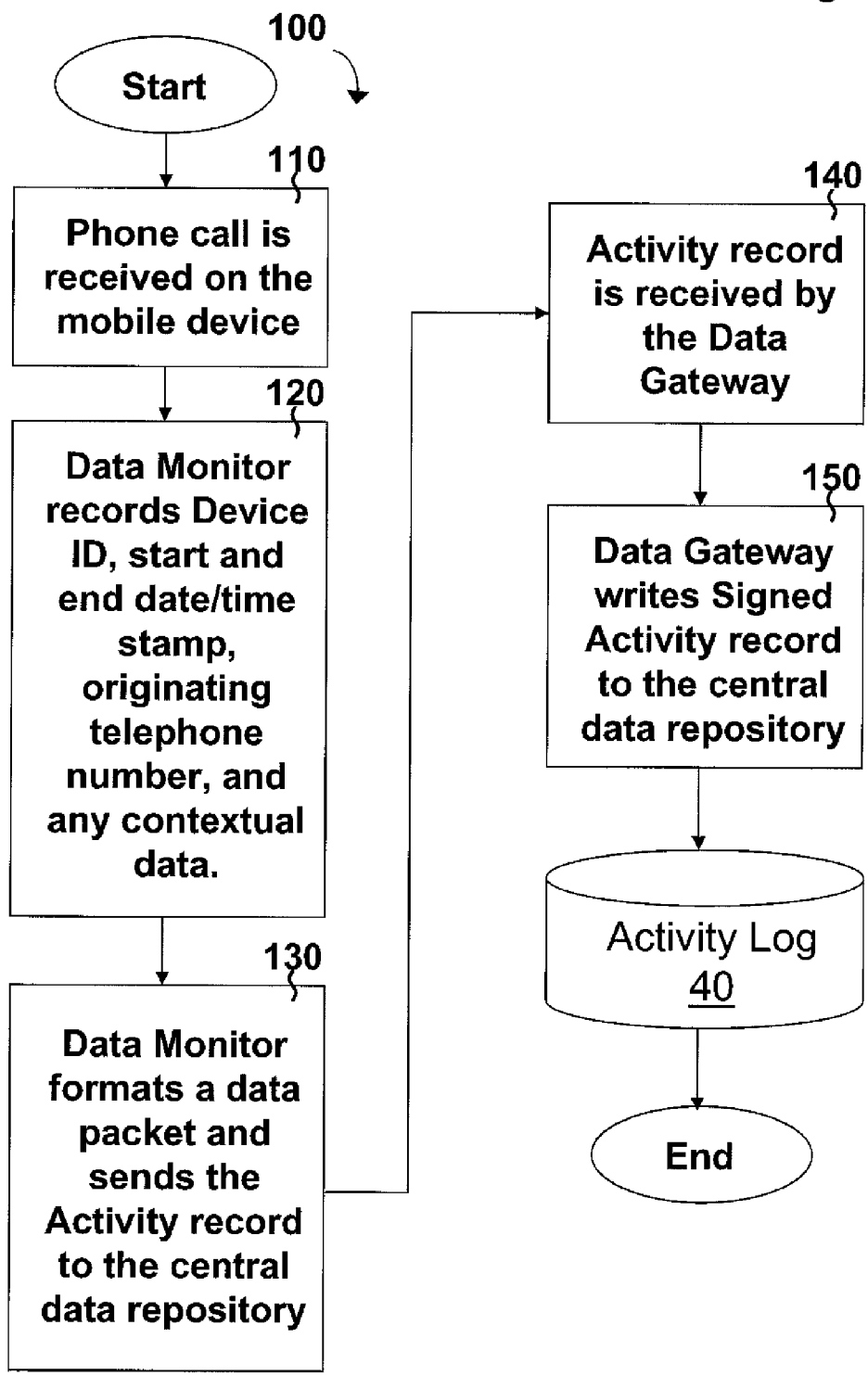
FIGS. 3A-3O illustrate exemplary flowcharts of the monitoring and collecting (logging) of event activity in FIG. 1 for each of the data services of FIG. 2 in accordance with one or more embodiments of the present invention.

For example, FIG. 3A illustrates a data flowchart for the capturing of an inbound voice call using Phone Application 22 on Mobile Communications Device 20 in accordance with an embodiment of the present invention. Initially, in step 110, a phone call is received on Mobile Communications Device 20. In step 120, Data Monitor 21 recognizes that Phone Application 22 data service has been initiated and begins to capture information regarding the use of the data service including, for example, the unique Device ID of the Mobile Communications Device 20, the start and end date/time stamp of the call, the originating phone number, and/or any contextual data. Once the call has been terminated (step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 to Activity Log 40, a central repository for all data collected from Mobile Communications Device 20.

Data gateway 30 may optionally write the data packet(s) in step 150 in a signed (e.g., digitally signed) fashion to activity log 40, in accordance with an embodiment of the present invention. For example, the activity record may be signed to identify (e.g., authenticate) the information and provide a chain of custody and authenticity for the stored information (e.g., for custody of evidence or other documentation requirements), as would be understood by one skilled in the art. Furthermore as a specific example, Data Gateway 30 may provide encryption and decryption processing for information related to the activity record and/or additional information, such as through the use of any one of several private or public key encryption or signature algorithms including the RSA algorithm (by RSA Security of Bedford, Mass.), the Digital Encryption Standard (DES), the Advanced Encryption Standard (AES), and broad families of signature or hash algorithms such as the Secure Hash Algorithm (SHA) and the Message Digest (MD) algorithm.

In general depending upon the level of security desired and the specific requirements or applications, the activity record may not have to be encrypted. For example, by not encrypting the activity record, considerable savings may be achieved in terms of processing, power savings, time, and/or memory. Thus, the activity record may be securely recorded and validated by generating an associated signature that can be verified. Consequently, the activity record is viewable and useable in a conventional fashion, but is also verifiable through the signature (e.g., for chain of custody or other evidentiary purposes), as would be understood by one skilled in the art.

Figure 3B:
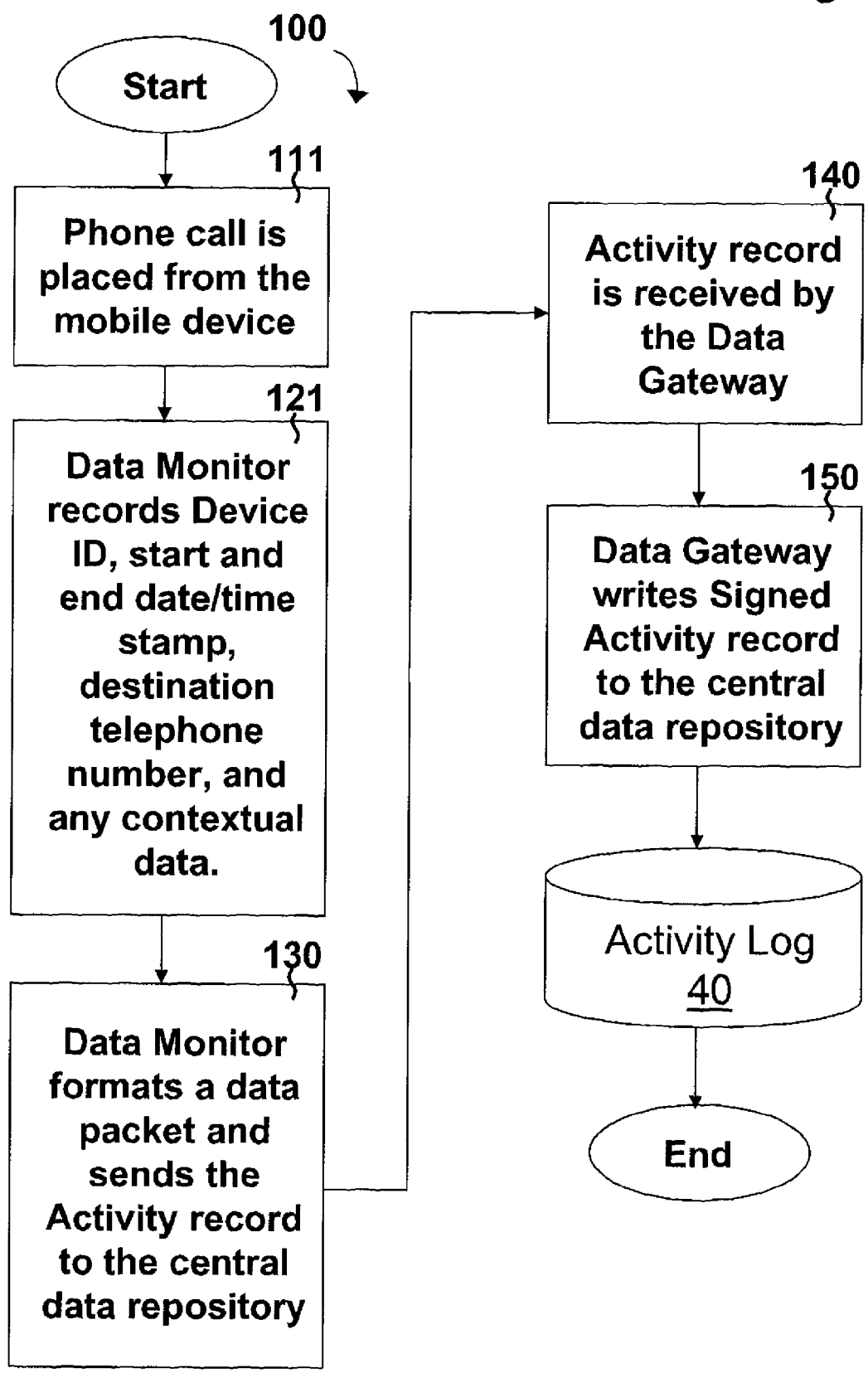

FIG. 3B illustrates a data flowchart for the capturing of an outbound voice call using Phone Application 22 on Mobile Communications Device 20 in accordance with an embodiment of the present invention. Initially, in step 111, a phone call is placed from Mobile Communications Device 20. In step 121, Data Monitor 21 recognizes that Phone Application 22 data service has been initiated and begins to capture information regarding the use of the data service including, for example, the unique Device ID of Mobile Communications Device 20, the start and end date/time stamp of the call, the destination phone number, and/or any contextual data. Once the call has been terminated (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3C:
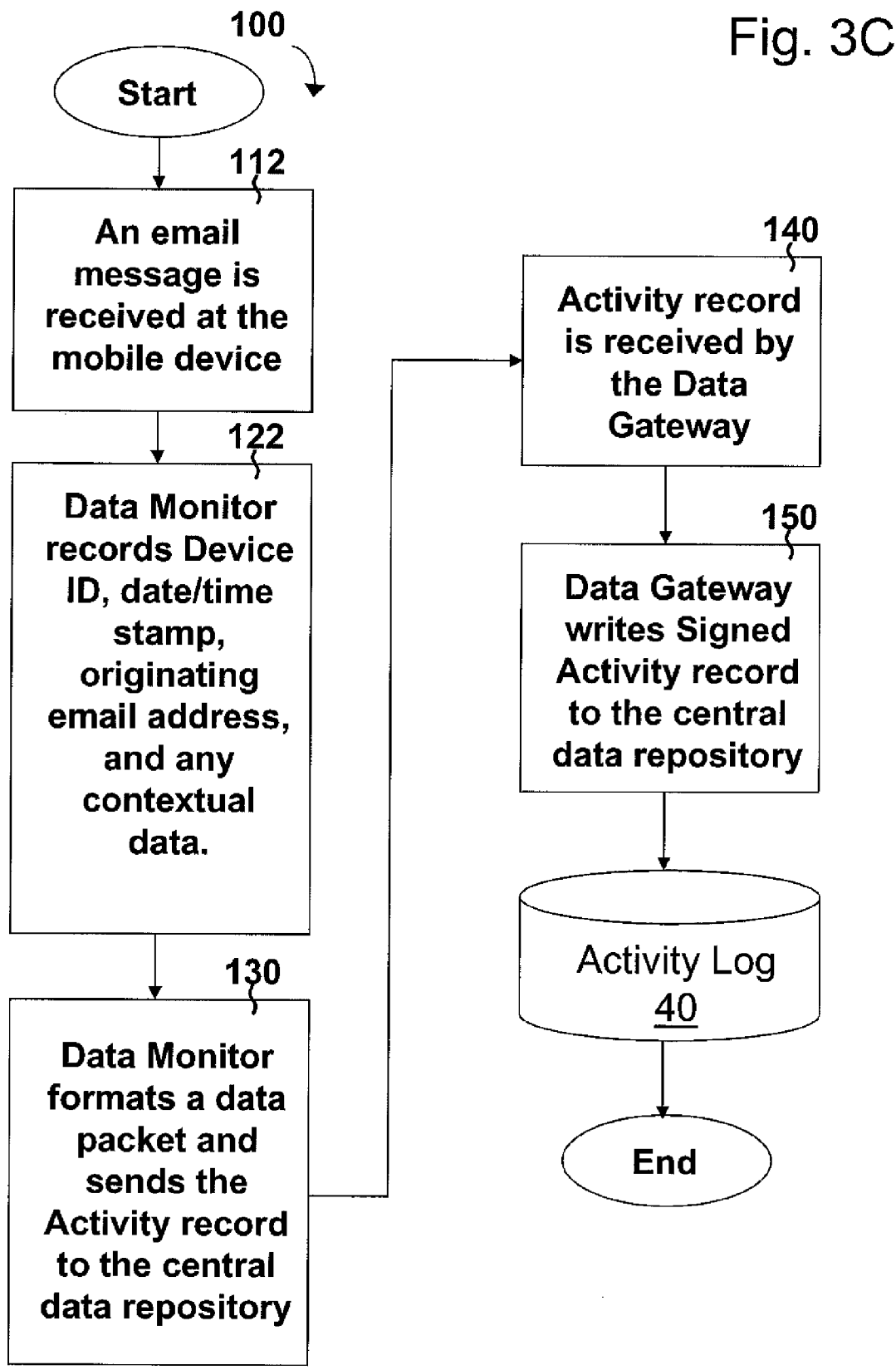

FIG. 3C illustrates a data flowchart for the capturing of an inbound email message using Email Application 23 on Mobile Communications Device 20 in accordance with an embodiment of the present invention. Initially, in step 112, an email message is received on Mobile Communications Device 20. In step 122, Data Monitor 21 recognizes that Email Application 23 data service has been initiated and begins to capture information regarding the use of the data service including, for example, the unique Device ID of Mobile Communications Device 20, the date/time stamp of the message, the originating email address, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in the Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3D:
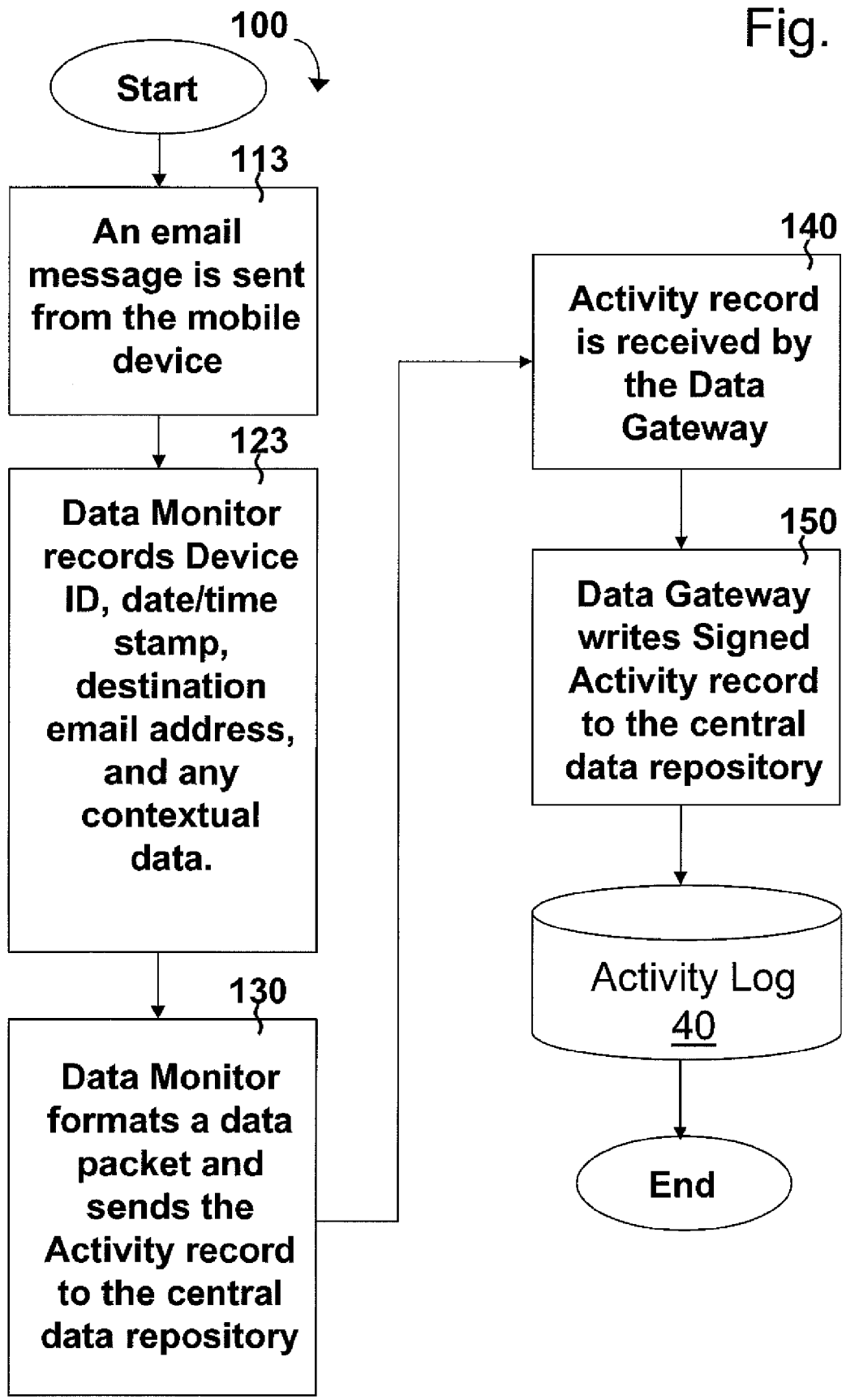

FIG. 3D illustrates a data flowchart for the capturing of an outbound email message using Email Application 23 on Mobile Communications Device 20 in accordance with an embodiment of the present invention. Initially, in step 113, an email message is sent from Mobile Communications Device 20. In step 123, the Data Monitor 21 recognizes that Email Application 23 data service has been initiated and begins to capture information regarding the use of the data service including, for example, the unique Device ID of Mobile Communications Device 20, the date/time stamp of the message, the destination email address, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3E:
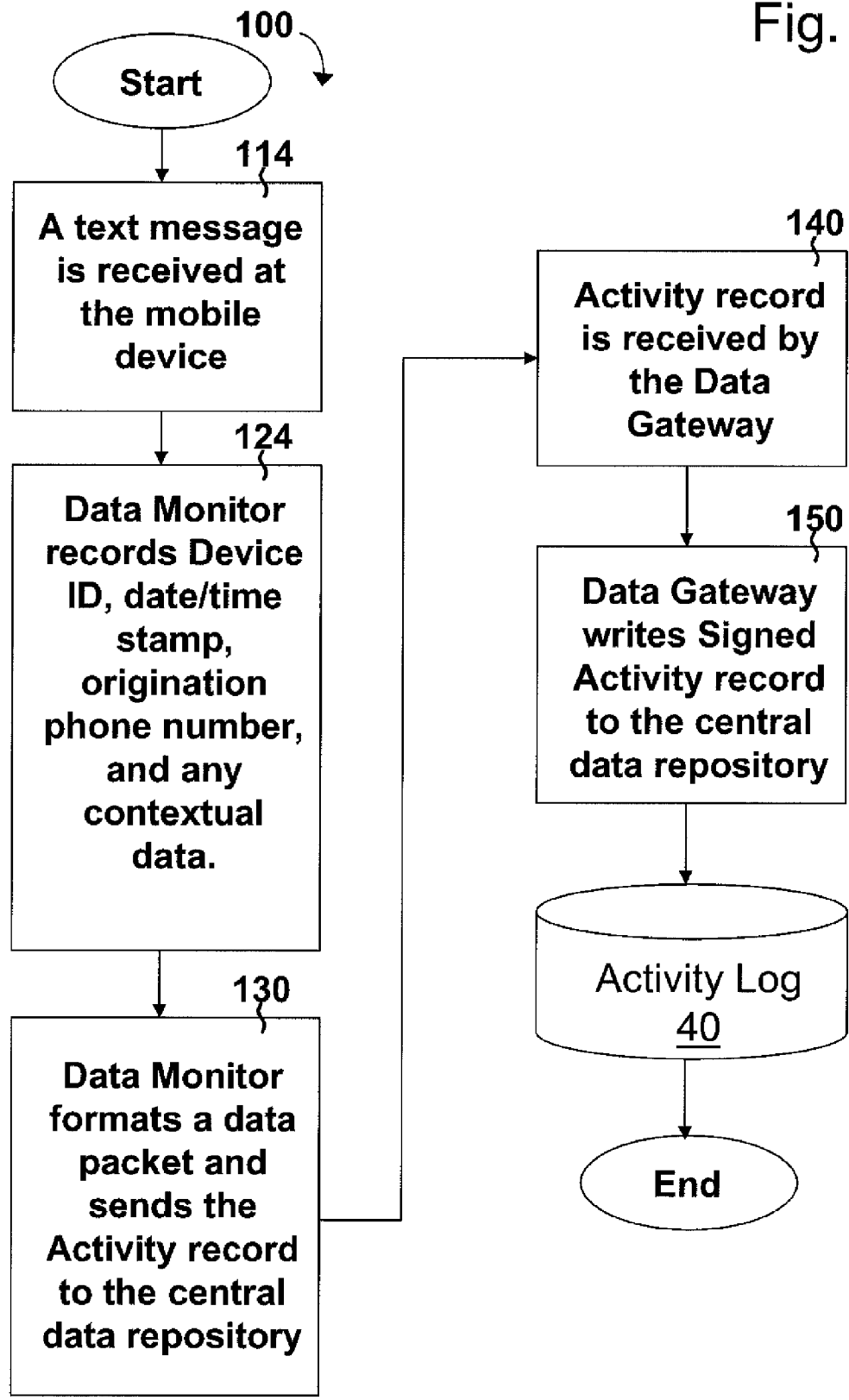

FIG. 3E illustrates a data flowchart for the capturing of an inbound text message using SMS Text Application 24 on Mobile Communications Device 20 in accordance with an embodiment of the present invention. Initially, in step 114, a text message is received on Mobile Communications Device 20. In step 124, Data Monitor 21 recognizes that the SMS Text Application 24 data service has been initiated and begins to capture information regarding the use of the data service including, for example, the unique Device ID of Mobile Communications Device 20, the date/time stamp of the message, the originating phone number, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3F:
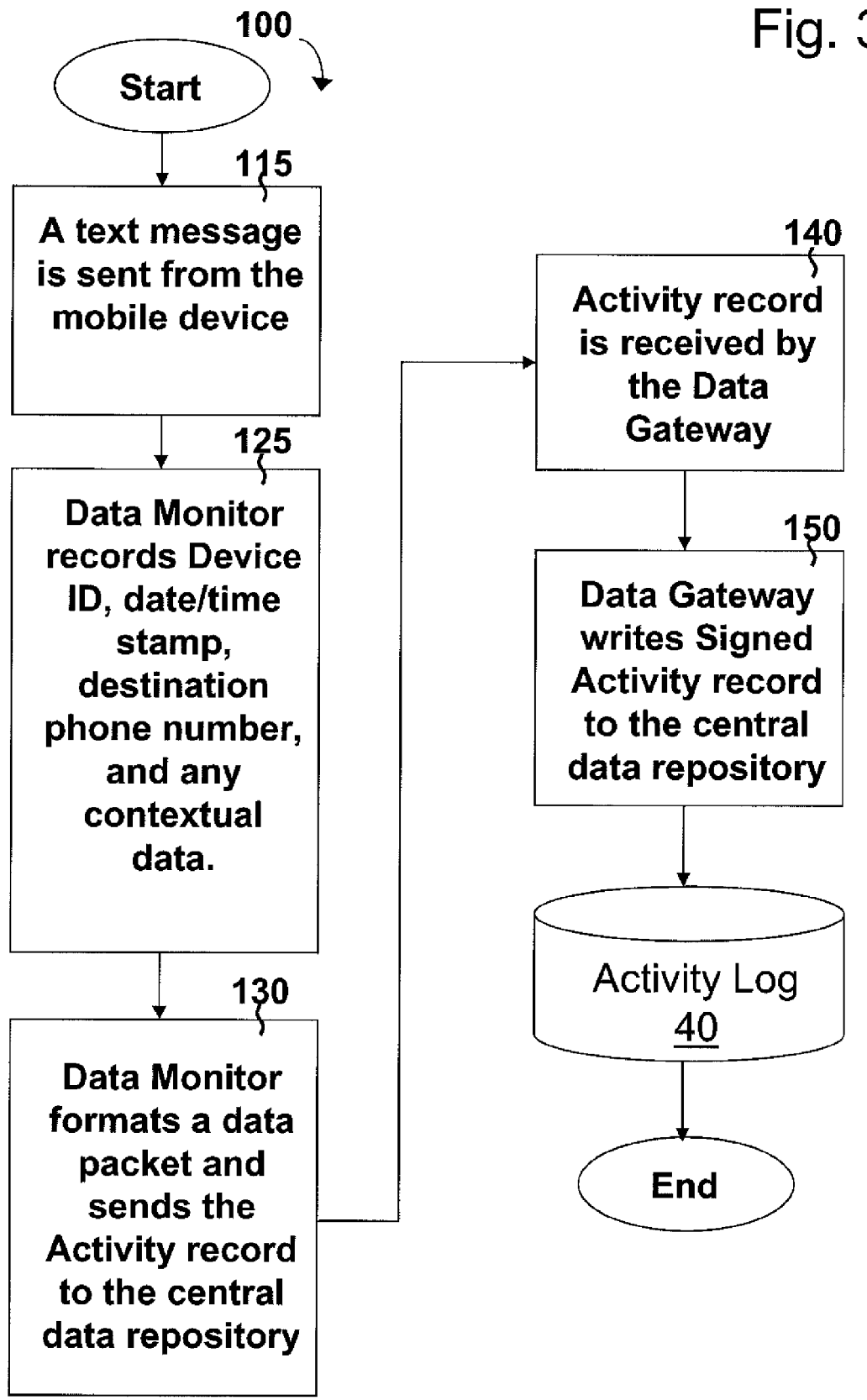

FIG. 3F illustrates a data flowchart for the capturing of an outbound text message using SMS Text Application 24 on Mobile Communications Device 20 in accordance with an embodiment of the present invention. Initially, in step 115, a text message is sent from Mobile Communications Device 20. In step 125, Data Monitor 21 recognizes that SMS Text Application 24 data service has been initiated and begins to capture information regarding the use of the data service including, for example, the unique Device ID of Mobile Communications Device 20, the date/time stamp of the message, the destination phone number, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3G:
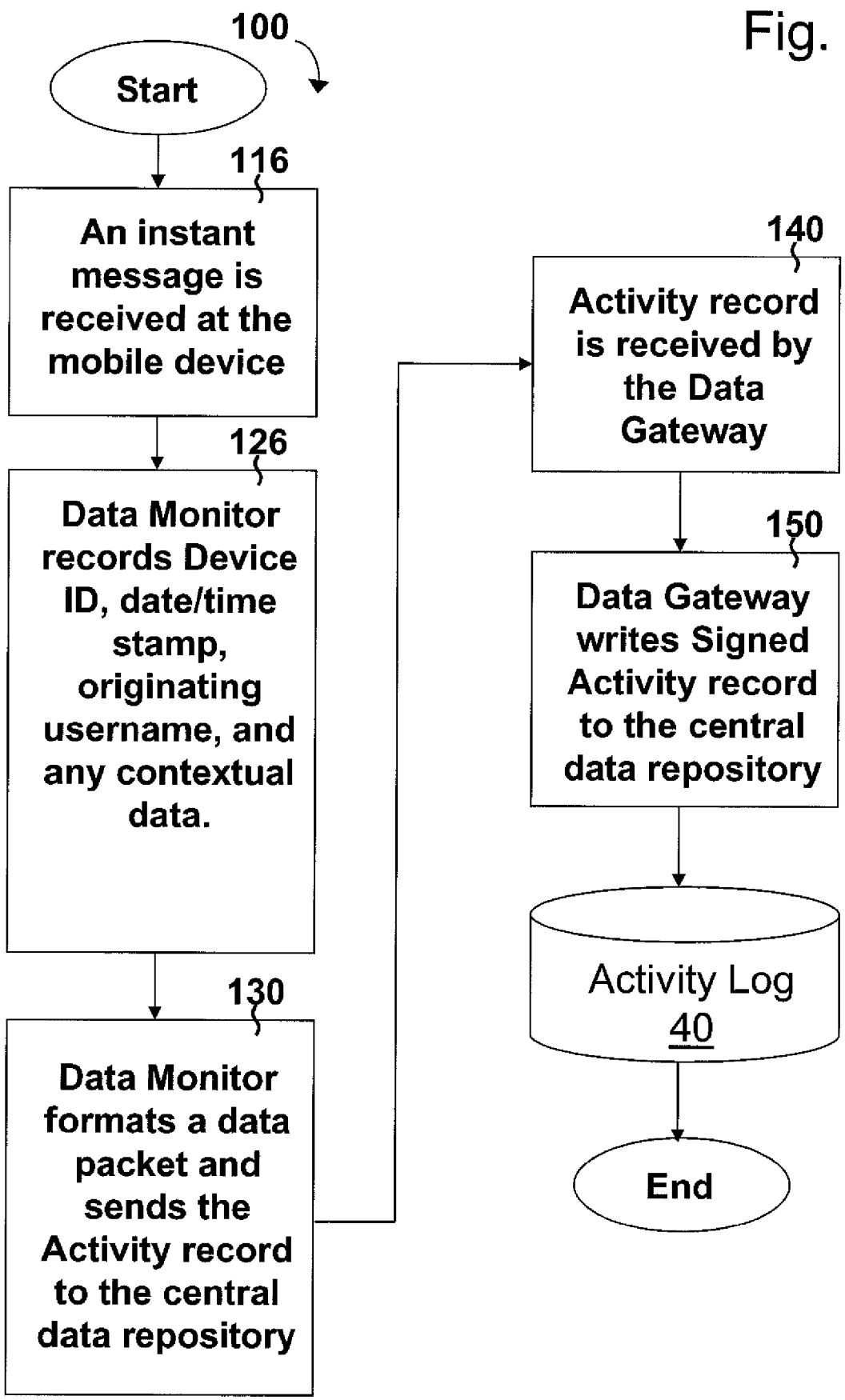

FIG. 3G illustrates a data flowchart for the capturing of an inbound instant message using Instant Messaging Application 25 on Mobile Communications Device 20 in accordance with an embodiment of the present invention. Initially, in step 116, an instant message is received on Mobile Communications Device 20. In step 126, Data Monitor 21 recognizes that Instant Messaging Application 25 data service has been initiated and begins to capture information regarding the use of the data service including, for example, the unique Device ID of Mobile Communications Device 20, the date/time stamp of the message, the originating username, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3H:
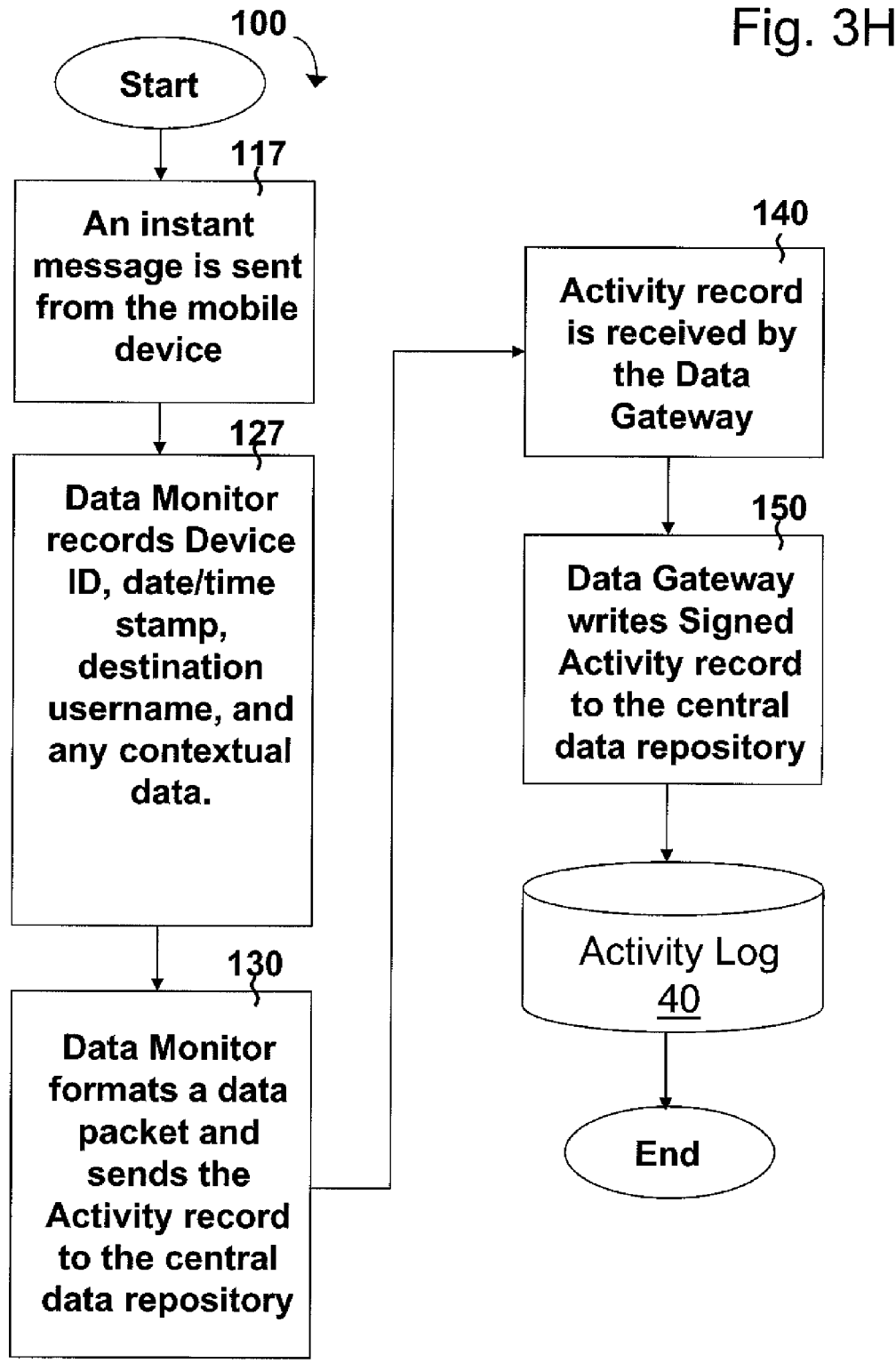

FIG. 3H illustrates a data flowchart for the capturing of an outbound instant message using Instant Messaging Application 25 on Mobile Communications Device 20 in accordance with an embodiment of the present invention. Initially, in step 117, an instant message is sent from Mobile Communications Device 20. In step 127, Data Monitor 21 recognizes that Instant Messaging Application 25 data service has been initiated and begins to capture information regarding the use of the data service including the unique Device ID of Mobile Communications Device 20, the date/time stamp of the message, the destination username, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3I:
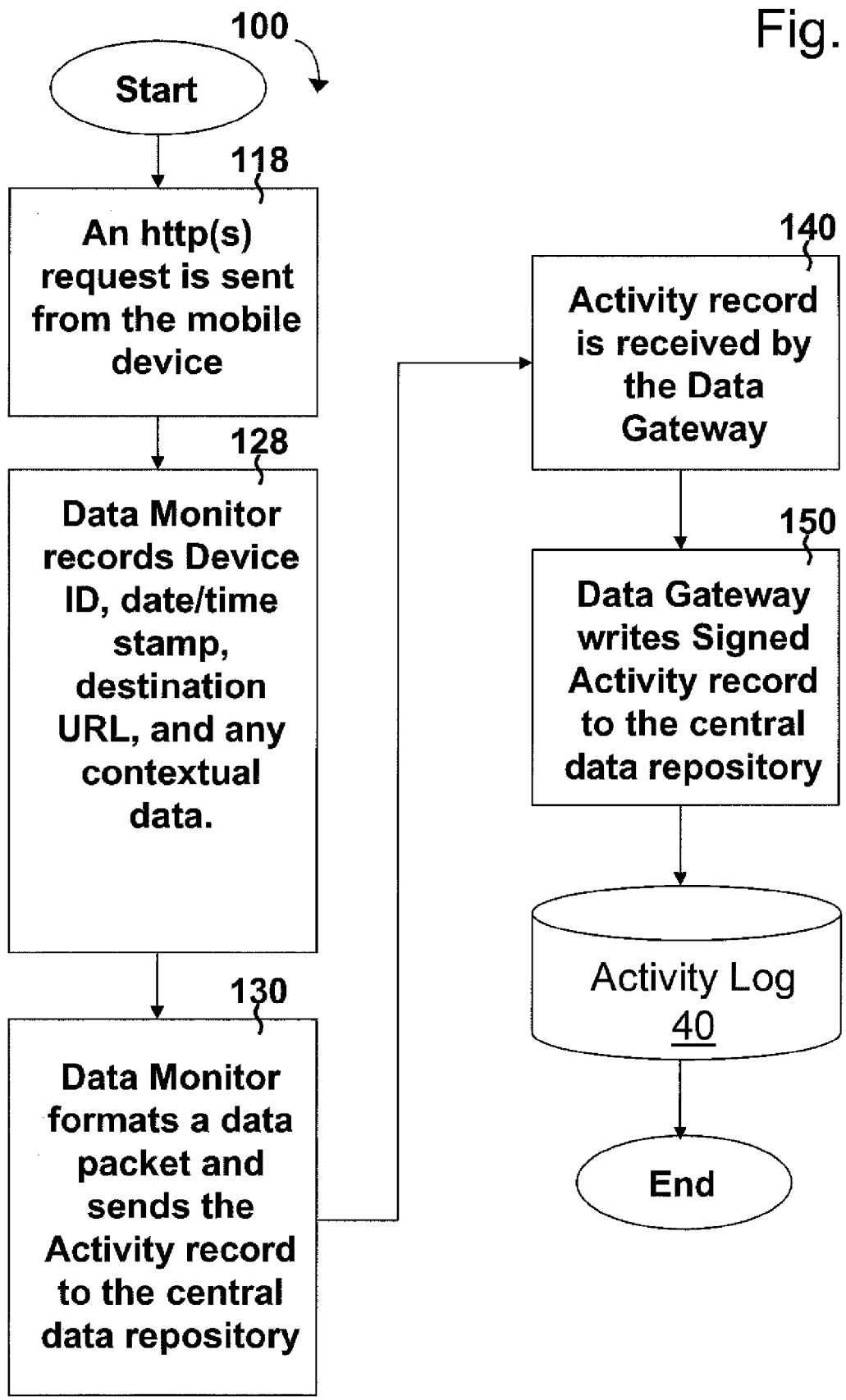

FIG. 3I illustrates a data flowchart for the capturing of an HTTP (Internet) request using Web Browser Application 26 on Mobile Communications Device 20 in accordance with an embodiment of the present invention. Initially, in step 118, an HTTP request is sent from Mobile Communications Device 20. In step 128, Data Monitor 21 recognizes that Web Browser Application 26 data service has been initiated and begins to capture information regarding the use of the data service including, for example, the unique Device ID of Mobile Communications Device 20, the date/time stamp of the request, the destination URL, and/or any contextual data. Once the request has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3J:
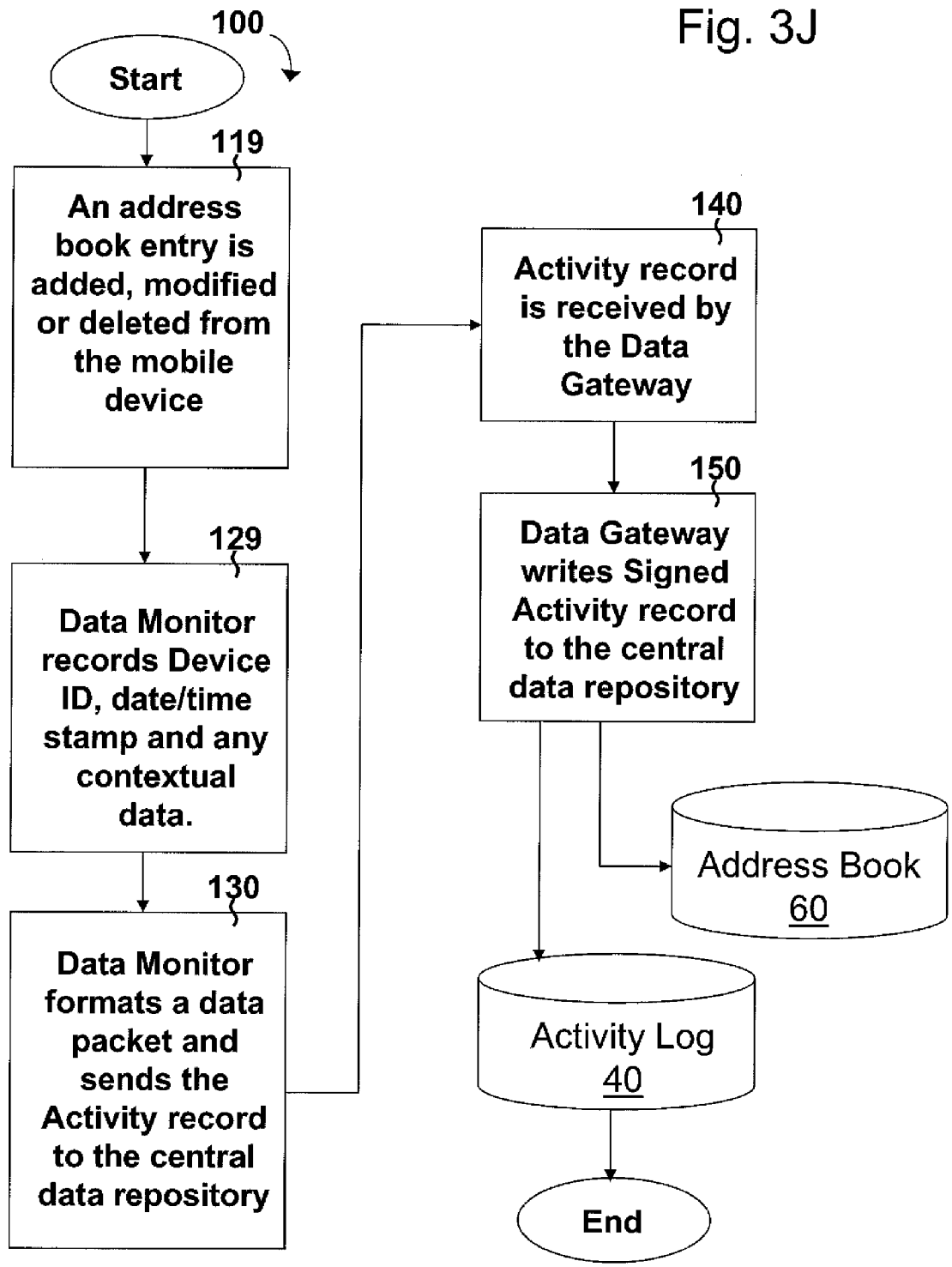

FIG. 3J illustrates a data flowchart for the capturing of a change to the address book using Address Book Application 27 on Mobile Communications Device 20 in accordance with an embodiment of the present invention. Initially, in step 119, an add, modify, or delete address book transaction is initiated on Mobile Communications Device 20. In step 129, Data Monitor 21 recognizes that Address Book Application 27 data service has been initiated and begins to capture information regarding the use of the data service including, for example, the unique Device ID of Mobile Communications Device 20, the date/time stamp of the change, and/or any contextual information such as the phone number or name that was changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20, and to Address Book 60, a central repository backup for all address book records residing on Mobile Communications Device 20.

Figure 3K:
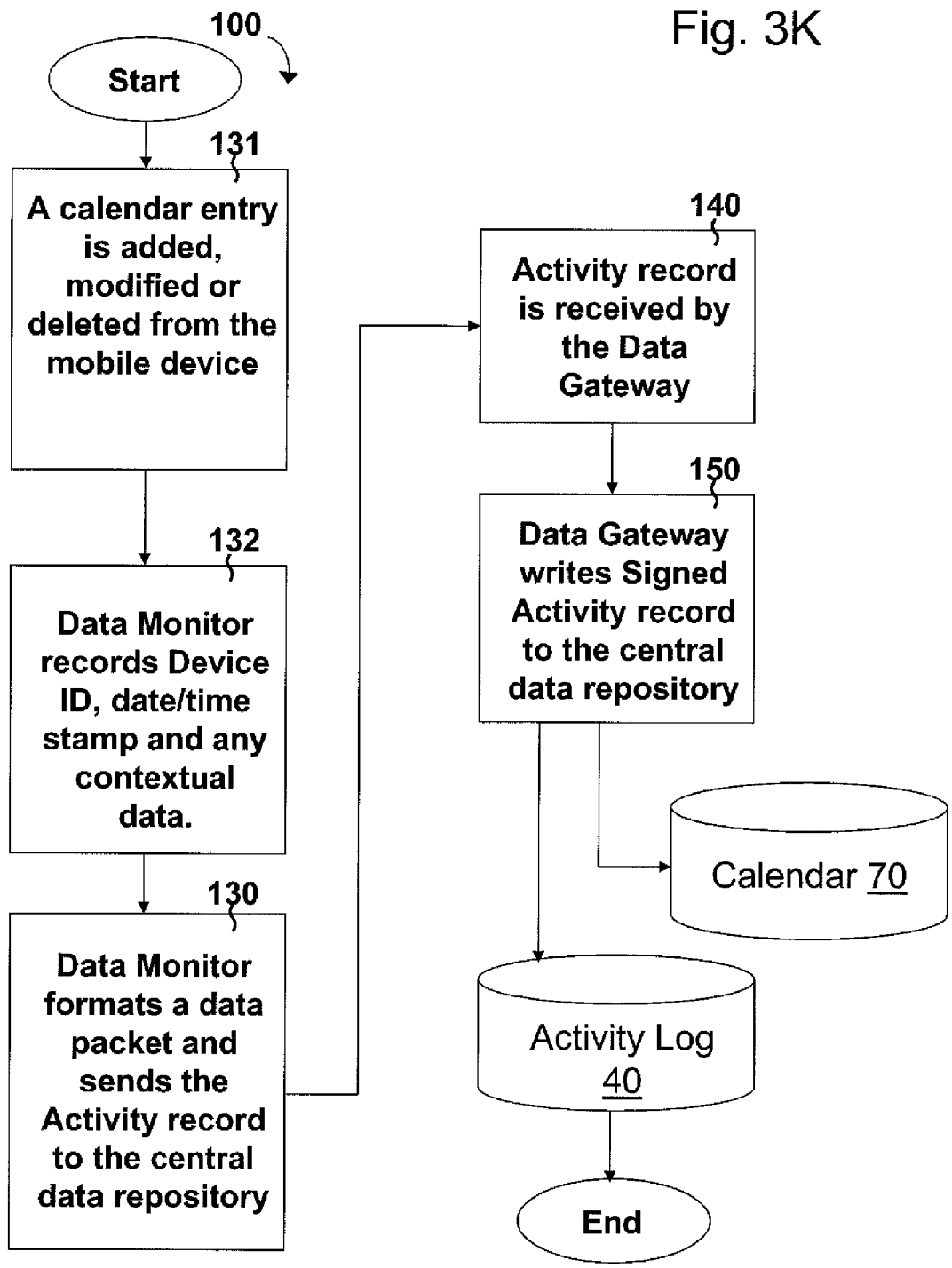

FIG. 3K illustrates a data flowchart for the capturing of a change to the calendar using Calendar/Task Application 28 on Mobile Communications Device 20 in accordance with an embodiment of the present invention. Initially, in step 131, an add, modify, or delete calendar transaction is initiated on Mobile Communications Device 20. In step 132, Data Monitor 21 recognizes that Calendar/Task Application 28 data service has been initiated and begins to capture information regarding the use of the data service including, for example, the unique Device ID of Mobile Communications Device 20, the date/time stamp of the change, and/or any contextual information such as the date or meeting location that was changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20, and to Calendar 70, a central repository backup for all calendar records residing on Mobile Communications Device 20.

FIG. 3L illustrates a data flowchart for the capturing of a change to the task list using Calendar/Task Application 28 on Mobile Communications Device 20 in accordance with an embodiment of the present invention. Initially, in step 133, an add, modify, or delete task transaction is initiated on Mobile Communications Device 20. In step 134, Data Monitor 21 recognizes that Calendar/Task Application 28 data service has been initiated and begins to capture information regarding the use of the data service including, for example, the unique Device ID of Mobile Communications Device 20, the date/time stamp of the change, and/or any contextual information such as the date or task details that were changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20, and to Tasks 80, a central repository backup for all task records residing on Mobile Communications Device 20.

Figure 3M:
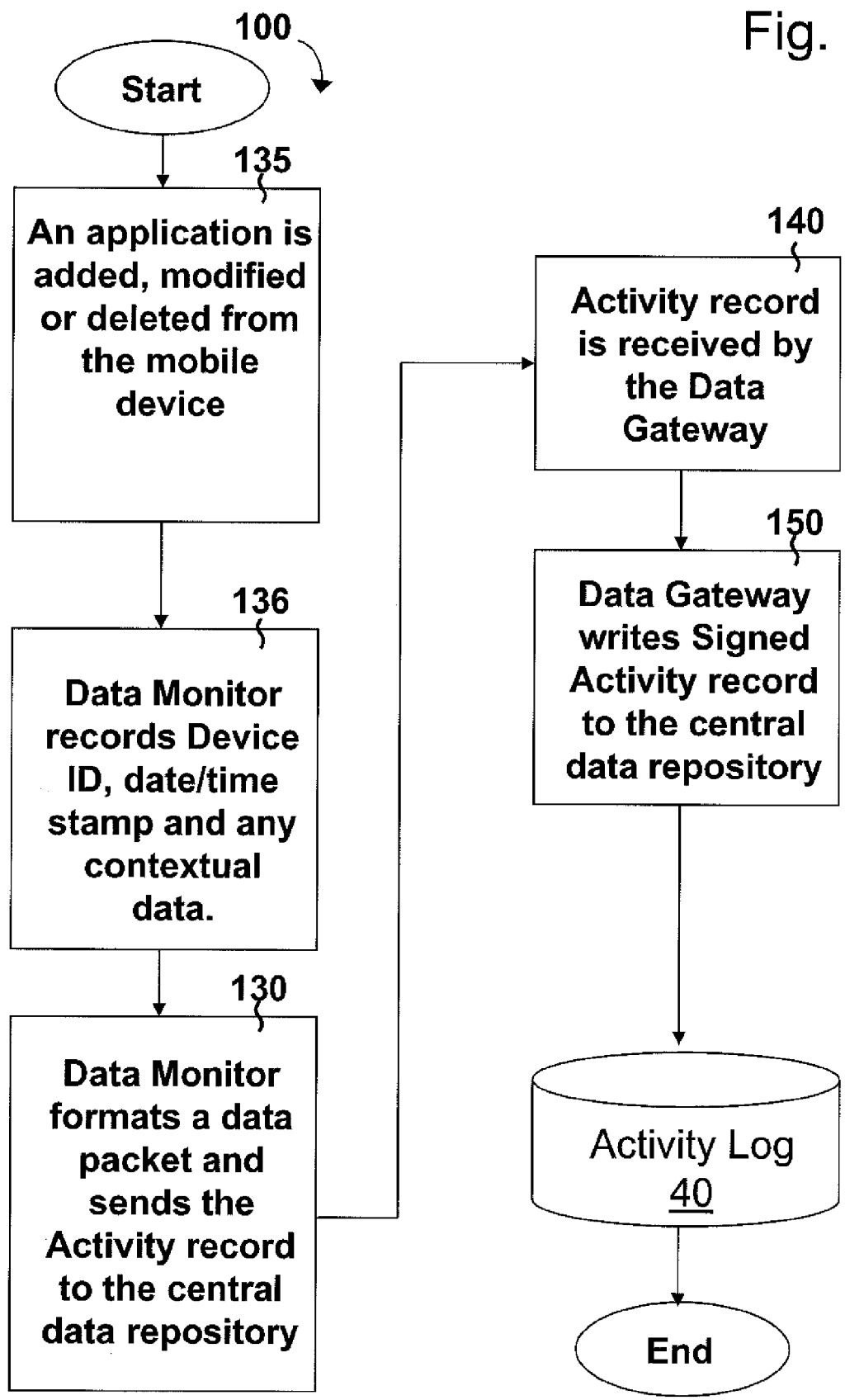

FIG. 3M illustrates a data flowchart for the capturing of a change to the list of installed applications on Mobile Communications Device 20 using Installation Application 29 on Mobile Communications Device 20 in accordance with an embodiment of the present invention. Initially, in step 135, an add, modify, or delete of an application is initiated on Mobile Communications Device 20. In step 136, Data Monitor 21 recognizes that Installation Application 29 data service has been initiated and begins to capture information regarding the use of the data service including the unique Device ID of Mobile Communications Device 20, the date/time stamp of the change, and/or any contextual information such as the name of the application(s) that were changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3N:
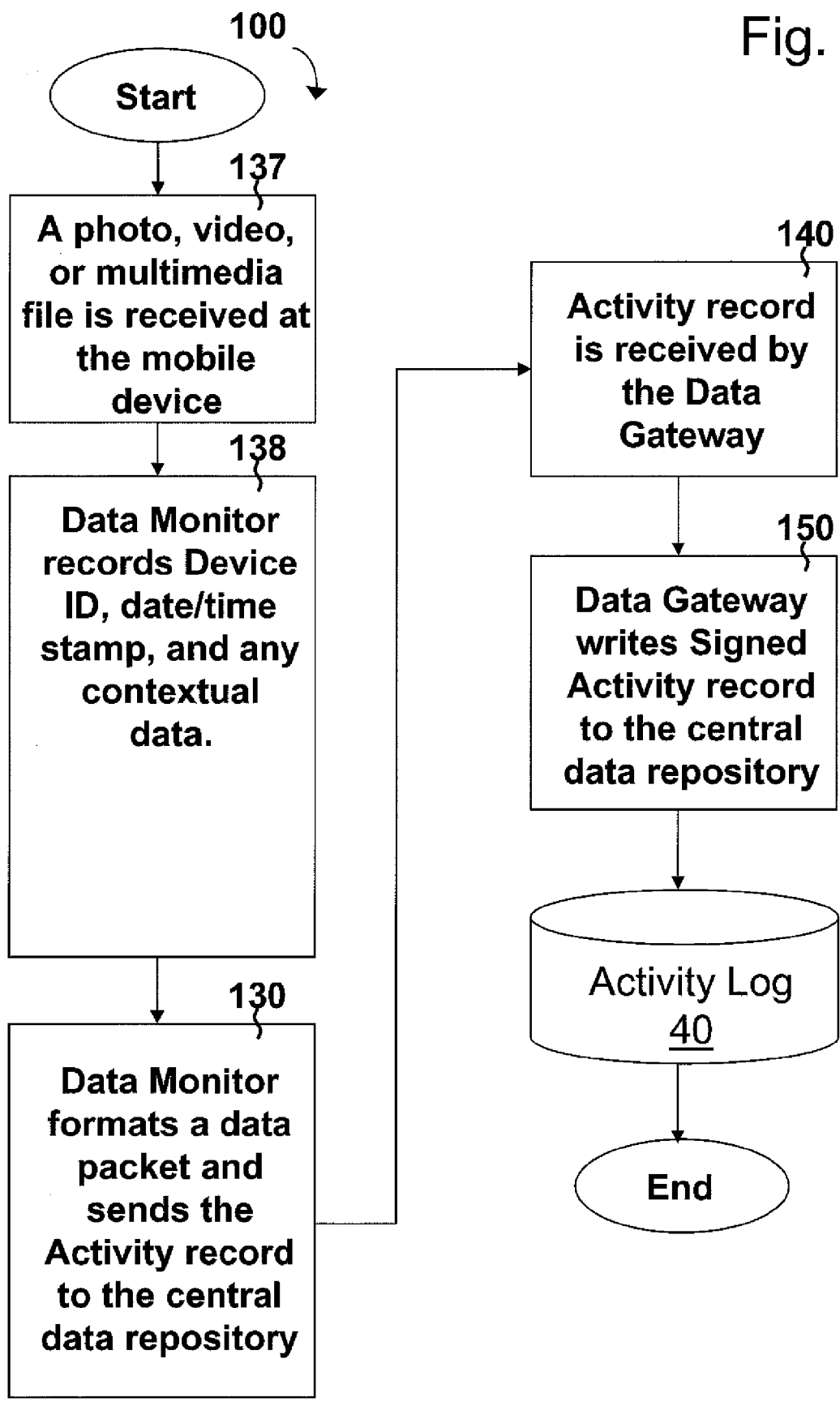

FIG. 3N illustrates a data flowchart for the capturing of an inbound photo, video, or other multimedia file using Photo/Video/Multimedia Application 31 on Mobile Communications Device 20 in accordance with an embodiment of the present invention. Initially, in step 137, a multimedia file is received on Mobile Communications Device 20. In step 138, Data Monitor 21 recognizes that the Photo/Video/Multimedia Application 31 data service has been initiated and begins to capture information regarding the use of the data service including, for example, the unique Device ID of Mobile Communications Device 20, the date/time stamp of the file transfer, and/or any contextual information contained in the file. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3O:
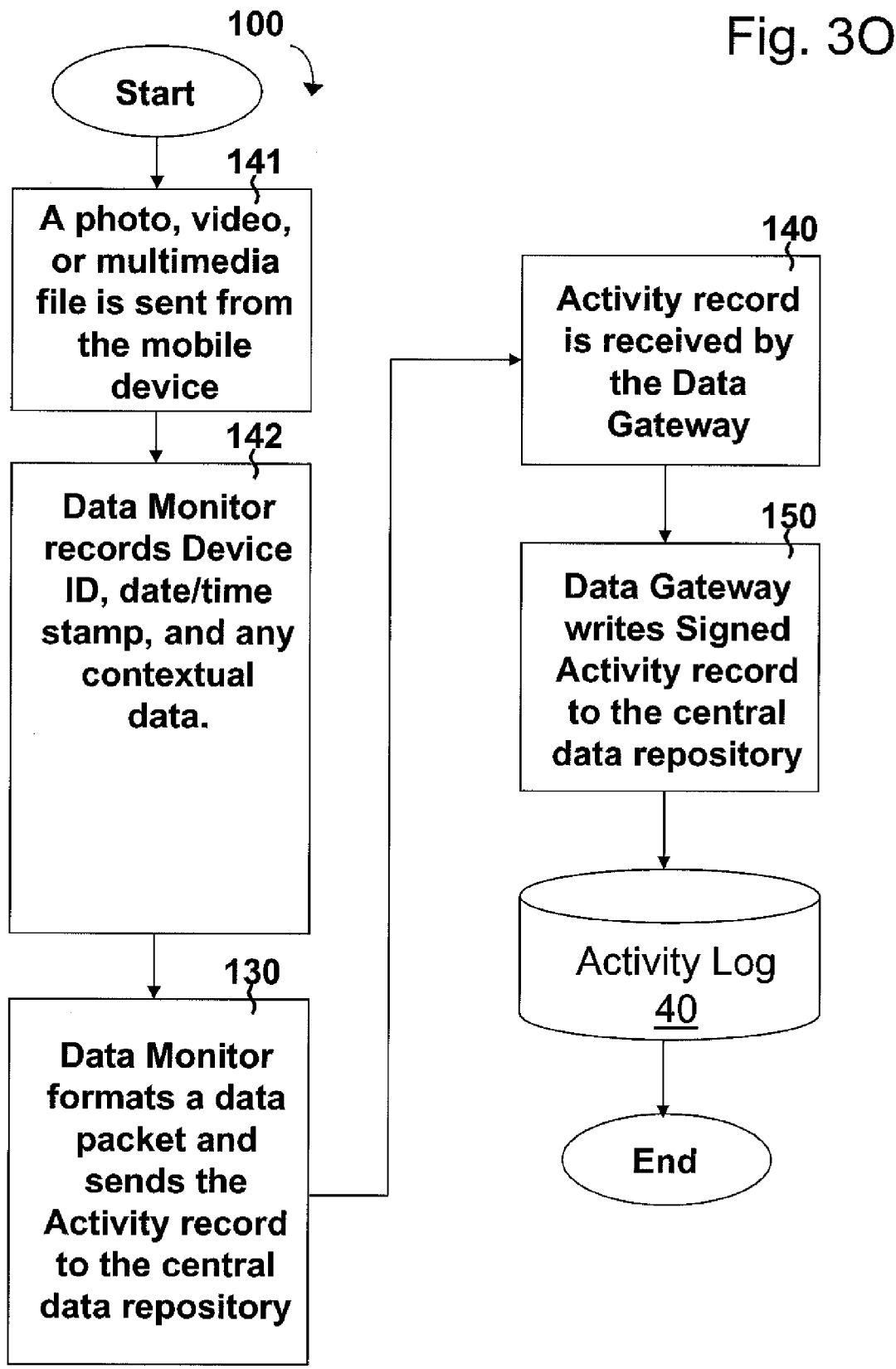

FIG. 3O illustrates a data flowchart for the capturing of an outbound photo, video, or other multimedia file using Photo/Video/Multimedia Application 31 on Mobile Communications Device 20 in accordance with an embodiment of the present invention. Initially, in step 141, a multimedia file is sent from Mobile Communications Device 20. In step 142, Data Monitor 21 recognizes that Photo/Video/Multimedia Application 31 data service has been initiated and begins to capture information regarding the use of the data service including, for example, the unique Device ID of Mobile Communications Device 20, the date/time stamp of the file transfer, and/or any contextual information contained in the file. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

One aspect of the monitoring capabilities in accordance with one or more embodiments of the present invention is the ability for the application to successfully log the activity that is occurring on Mobile Communications Device 20 into a centrally located Activity Log 40. An exemplary structure for Activity Log 40 database is shown in tabular form in FIGS. 4A and 4B in accordance with an embodiment of the present invention.

The first column identifies a unique key (record ID) that is automatically assigned to each row of the database. This is followed by a unique account ID which identifies the account associated with the log record, the data service that was invoked (message type), and whether the communication was inbound (in) or outbound (out) from the Mobile Communications Device 20. The Start Time is a date/time stamp identifying the start of a call or completion of a data service transaction. The End Time is a date/time stamp identifying the completion of a call.

The Caller ID field shows the originating phone number, email address, or username for inbound communications and the destination phone number, email address, or username for outbound communications. The Log field collects contextual information regarding the transaction which can include the contents of an email message, instant message, text message, or any other form of information in accordance with some embodiments, including audio, photo, video, textual data, and/or multimedia information.

The remaining fields found in FIG. 4B are supplemental data elements associated with a data transaction with Mobile Communications Device 20 in accordance with one or more embodiments of the present invention. These data elements are optional and may be implemented and used, for example, for legal proceedings and other supplemental applications. The Long field shows the Longitude of the phone at the time of the transaction, while the Lat field shows the Latitude of the phone at the time of the transaction (e.g., information provided by GPS, cell-based location applications, or network-based location applications as discussed previously herein). The CRC (cyclic redundancy code) field is for the digital signature information of the database record to ensure its authenticity (e.g., as discussed in reference to FIG. 3a), which may be used to provide the CRC checksum or other types of error-detecting code information desired. The Auth field is for the method of authentication used such as biometric, password, no authentication (N/A), etc. The Auth ID field (authorization identification) is for the identity of the person that authorized the transaction. The Carrier Log Auth field (authorization field) is for the record number of the carrier's accounting system, which relates to the transaction (e.g., cell phone carrier or other data communication provider information as discussed in reference to FIG. 1, depending on the type of data communication).

The rules that govern the access to data services on Mobile Communications Device 20 are maintained, for example, in Permissions 50 database. In accordance with an embodiment of the invention, this database would be accessible by the owner of the account using an HTML web interface. An exemplary structure for Permissions 50 database is shown in tabular form in FIG. 5 in accordance with an embodiment of the present invention.

The first column identifies a unique key that is automatically assigned to each row of the database. This is followed by a unique account ID which identifies the account associated with the permission record. The next field lists the data service for which the rules are to be applied, followed by the specific rules as to allow or deny access to that data service on the Mobile Communications Device 20.

As an example, a value of true in the Allow column would allow the use of that data service for any entry found in the address book on the Mobile Communications Device 20, while a value of true in the Deny column would deny the use of that data service for any entry not found in the address book on the Mobile Communications Device 20. As another example, in accordance with an alternate embodiment of the present invention, would be to allow or deny use of the data service based on the contextual content of the message.

The Alert Type and alert number fields identify the corresponding preferred method of alert notification and related contact information (e.g., email address, phone number, etc. to use to provide the alert). Multiple rows in the database for the same Account and Data Service would be used to alert multiple users of an unauthorized event as exemplified in Record ID rows 103 and 104 of FIG. 5 in accordance with an embodiment of the present invention.

Figure 6A:
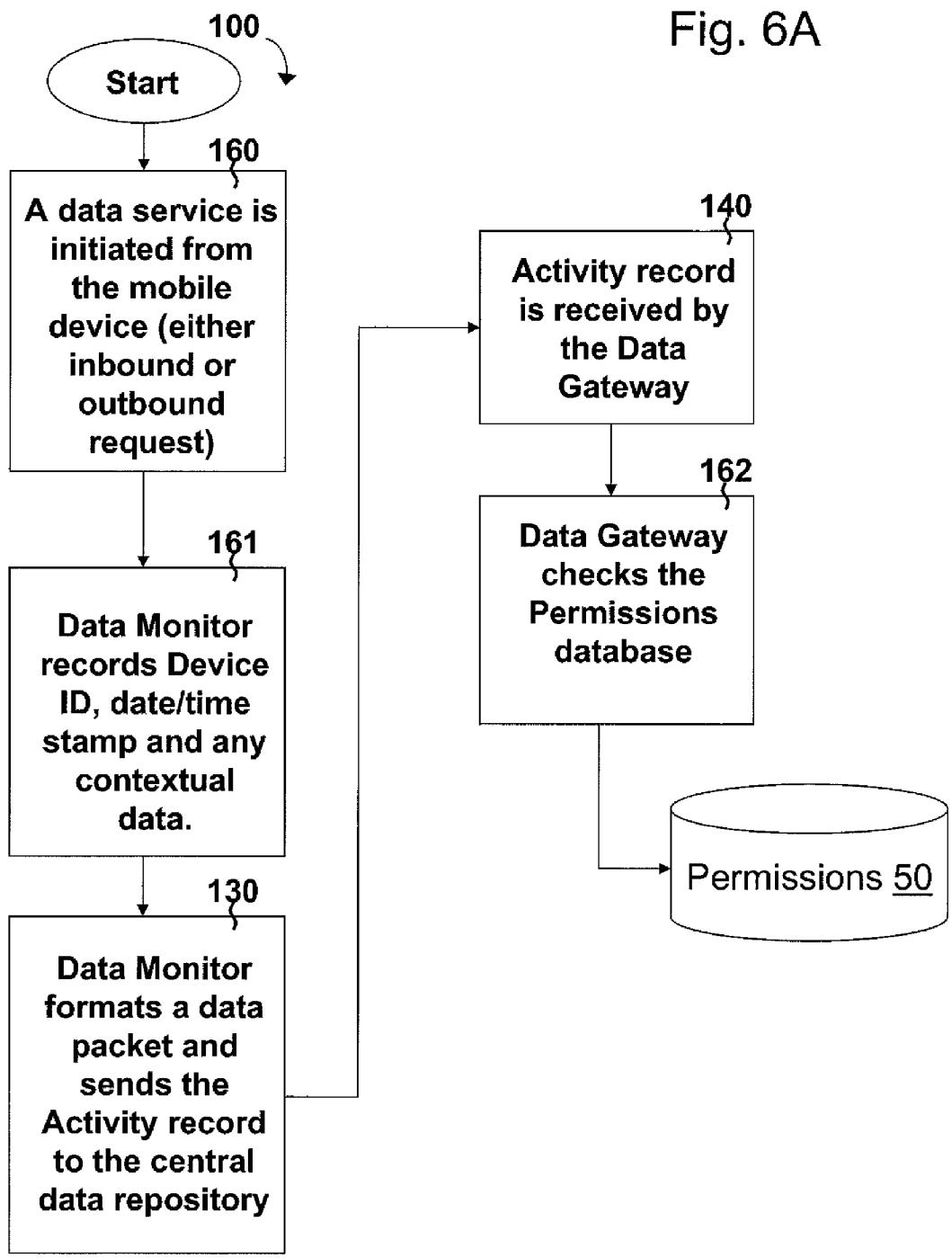
FIGS. 6A-6B illustrate exemplary flowcharts where the data service on a wireless device is processed or blocked based on the contextual information being passed through the data service in accordance with an embodiment of the present invention.
Figure 6B:
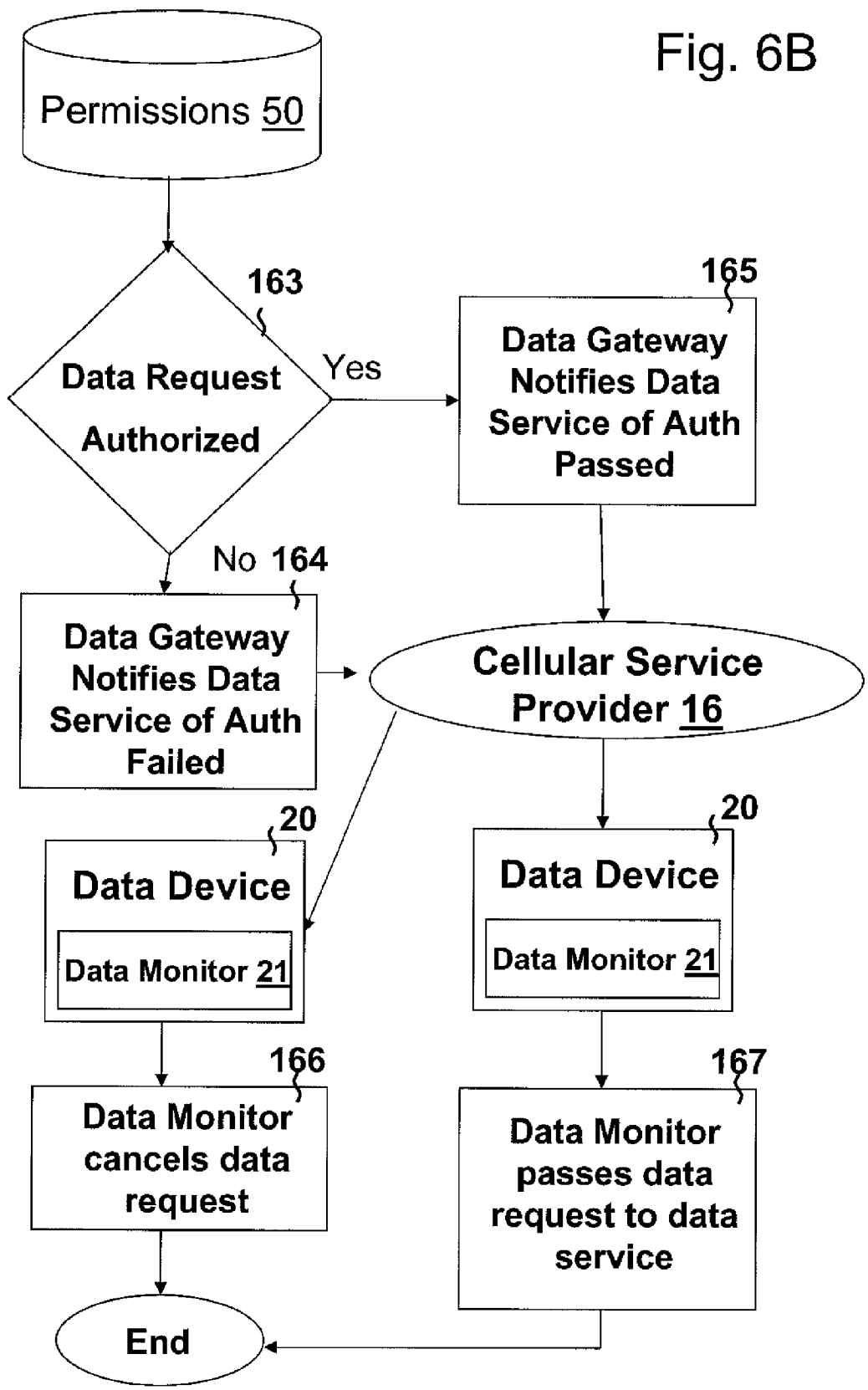

FIGS. 6A and 6B illustrate exemplary data flowcharts in accordance with an alternative embodiment of the invention where the contextual content of the communication is checked against permissions 50 database prior to allowing Mobile Communications Device 20 access to the data services 22 through 29 and 31. Initially, in step 160, one or more data services 22 through 29 and 31 may be initiated on Mobile Communications Device 20. In step 161, Data Monitor 21 recognizes that a data service has been initiated and begins to capture information regarding the use of the data service including, for example, the unique Device ID of Mobile Communications Device 20, the date/time stamp, the originating or destination phone number, email address, or username, and/or the contextual content of the data packet.

Once the request for a data service has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then checks the content of the data packet(s) in step 162 against Permissions 50 database located in Data Center 17. If the data request was not authorized (step 163), Data Gateway 30 notifies (step 164) Mobile Communications Device 20 by sending a message through Cellular Service Provider 16 to Data Monitor 21 on Mobile Communications Device 20. In Step 166, Data Monitor 21 cancels the data service request. If the data request was authorized (step 163), Data Gateway 30 notifies (step 165) Mobile Communications Device 20 by sending a message through Cellular Service Provider 16 to Data Monitor 21 on Mobile Communications Device 20. In Step 167, Data Monitor 21 completes the authorized data service request.

Figure 7B:
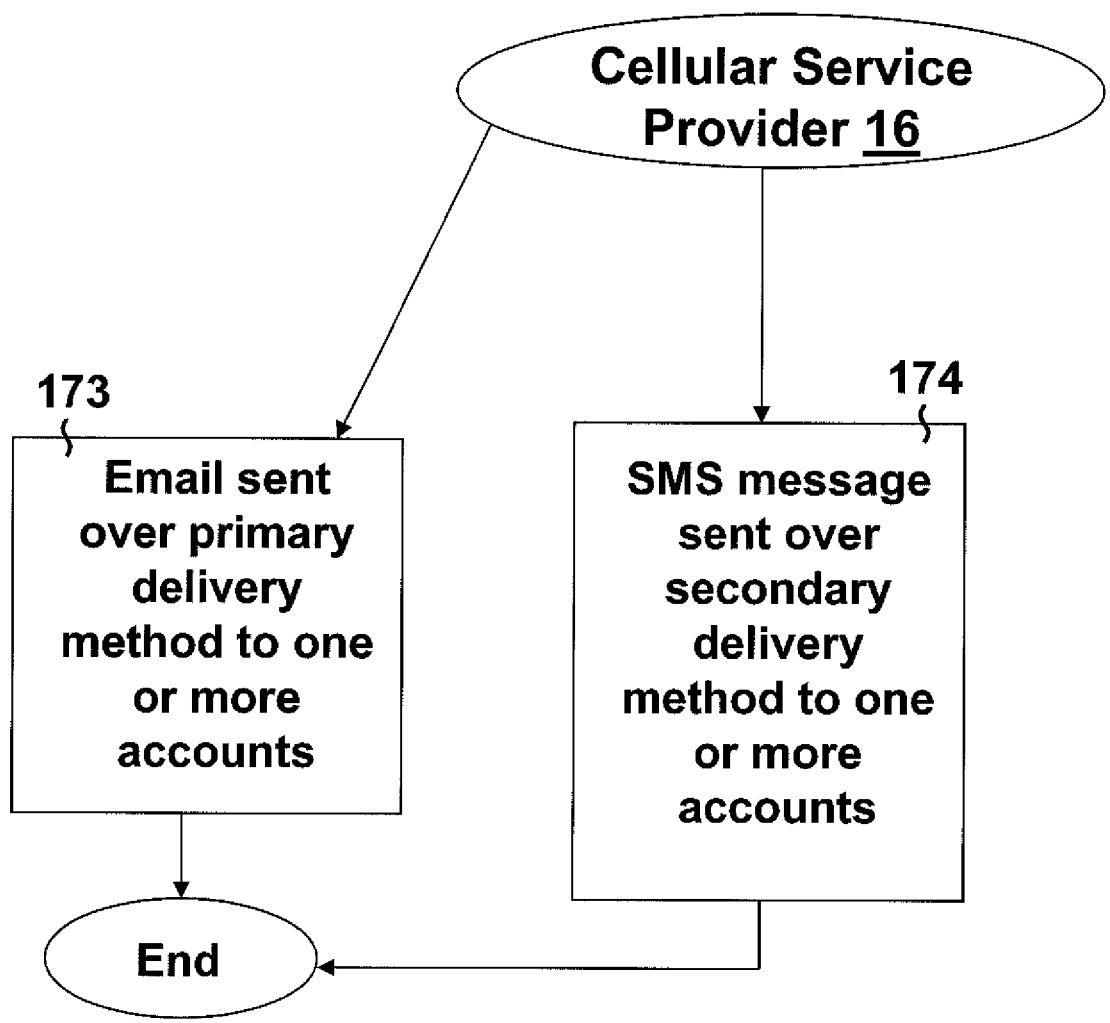

FIGS. 7A and 7B illustrate exemplary data flowcharts for the notification of unauthorized events on Mobile Communications Device 20 in accordance with an embodiment of the present invention. In Step 170, Alert Monitor 70 is monitoring the records being entered into Activity Log 40 database by Data Gateway 30. Each record is checked against Permissions 50 database. If the Log Activity is authorized (step 171), no further action is required.

If the Log Activity is not authorized (step 171), then Data Gateway 30 looks up the delivery notification method in Permissions 50 database (step 172) and sends an alert message via Cellular Service Provider 16 or alternately through any available communications network including for example PIN-to-PIN, Wi-Fi, Bluetooth, Personal Area Networks, Local Area Networks, and/or Public Networks (e.g., cellular networks, satellite networks, and/or the Internet) to one or more destinations. As an example, step 173 identifies an email message being sent to one of the users of the account while step 174 identifies an SMS text message being sent to an alternate user of the account. In accordance with one or more embodiments of the present invention, many forms of data communications may be supported, including for example voice messages, SMS Text Messages, email or any other publicly accepted machine-to-machine communications protocol.

FIG. 8 illustrates an exemplary data flowchart for the reporting or exporting of information stored in the Activity Log 40 database in accordance with one or more embodiments. For example, an administrator (e.g., user) of the application or system (e.g., of Data Center 17) may view the contents of Activity Log 40 and request an Activity Report 90 from the system (step 175). Alternatively or in addition, the administrator may be requested or may identify a situation where the content of Activity Log 40 contains evidence of a criminal act and is reported (step 176) via an electronic transmission to a Law Enforcement agency 95.

For example, the administrator may discover a photograph of child pornography (or other illegal activity) captured in a Multimedia Messaging Service (MMS) message provided to the monitored mobile phone (e.g., Mobile Communications Device 20). This photograph along with the message headers, identifying source IDs and other evidentiary information may be filed, for example, electronically with the Center for Missing and Exploited Children or to the appropriate government agency. In general in accordance with one or more embodiments, Activity Report 90 and/or information provided to Law Enforcement agency 95 may satisfy chain of custody or other forms of custody of evidence requirements with respect to authenticity of the record or other information due to the signing (and possible encryption) of the information as discussed previously (e.g., in reference to FIGS. 3A-3O). Thus as disclosed herein, a report containing authenticating data may be generated, e.g., from activity logs) between Mobile Communications Device 20 and a third party, which may be utilized for example by the party monitoring Mobile Communications Device 20 and/or by law enforcement authorities or other entities (e.g., agencies or organizations) lawfully provided with the report.

As disclosed herein, systems, methods, and program products are disclosed, in accordance with one or more embodiments of the present invention, which are directed to monitoring the communications to and from a wireless data device. For example in accordance with an embodiment, each of the data services on a wireless device, such as a cell phone, a Smartphone, or a personal digital assistant (PDA), may be monitored against the permissions (e.g., rules) stored in a central repository. Data services may include all forms of communications between the device and a third party including, for example, cellular voice calls, short message service (SMS) text messages, email, instant messaging sessions, and/or the applications used by the data services including, for example, the address book, calendar, and tasks maintained on the wireless device.

For example in accordance with one or more embodiments, a client application installed on a mobile communications device, such as for example a cell phone or PDA, transmits detailed device usage information using a wireless data connection from the device to a central repository. Alternatively or in combination with the client application installed on a mobile communications device, in accordance with one or more embodiments, a network data monitor may be installed on a communications network communicating with the mobile communications device to monitor and collect the detailed mobile communications device usage information to provide to the central repository. The communications network may represent a network of a cellular service provider or any other type of communications network (e.g., any standards or protocols) including for example PIN-to-PIN, Wi-Fi, Bluetooth, Personal Area Networks, Local Area Networks, and/or Public Networks (e.g., cellular networks, satellite networks, and/or the Internet).

Figure 9:
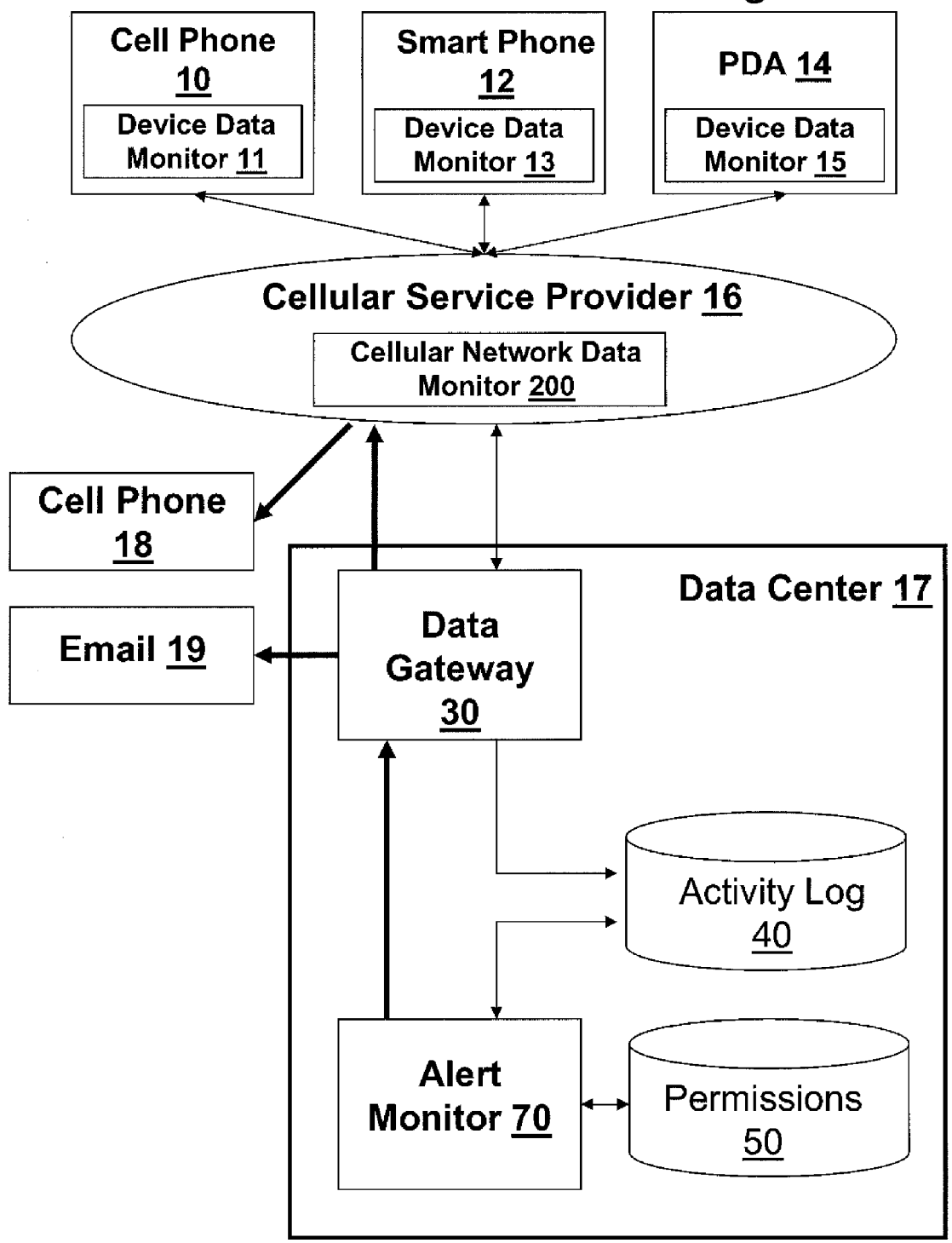
FIG. 9 is a block diagram of a system illustrating techniques to monitor the activities on a wireless device via data monitoring on the wireless device and/or on a carrier network in accordance with an embodiment of the present invention.

As an example, FIG. 9 is a block diagram of a system illustrating techniques to monitor the activities on a wireless device via data monitoring on the wireless device and/or on a communication network (e.g., carrier network) in accordance with an embodiment of the present invention. As can be seen, FIG. 9 is similar to FIG. 1, but further includes a Network Data Monitor 200 (e.g., a cellular-based network data monitoring program tool). Network Data Monitor 200 may be viewed as functioning and implemented in a similar fashion as described for Data Monitoring program tools 11, 13, or 15, but is located within the communications network (e.g., of Cellular Service Provider 16) rather than located within corresponding wireless device (e.g., mobile communications device) 10, 12, or 14. For example, Network Data Monitor 200 may represent software run by a logic device (e.g., a processor) of Cellular Service Provider 16 or a hardware-based logic device of Cellular Service Provider 16.

Network Data Monitor 200 monitors the data services on wireless devices 10, 12, and 14 via communications between wireless devices 10, 12, and 14 and Cellular Service Provider 16 and provides the information collected on data services use to Data Gateway 30. Therefore, Network Data Monitor 200 may monitor and collect the various information on data services use for the various wireless devices (e.g., wireless devices 10, 12, and 14) communicating with Cellular Service Provider 16 and provide this information to Data Center 17 (e.g., via Data Gateway 30 or through any available communications network) such that this information can then be logged, processed, and analyzed in a similar fashion as described herein in reference to FIGS. 1-8.

In accordance with an embodiment, Network Data Monitor 200 may perform the data services use monitoring solely for a wireless device (e.g., wireless device 10) whether or not that wireless device has a Device Data Monitor programming tool (e.g., Device Data Monitor 11). Alternatively in accordance with an embodiment, Network Data Monitor 200 may perform the data services use monitoring solely for a wireless device (e.g., wireless device 10) only if that wireless device does not have a Device Data Monitor programming tool (e.g., Device Data Monitor 11). Alternatively, in accordance with an embodiment, Network Data Monitor 200 may perform the data services use monitoring for a wireless device (e.g., wireless device 10) in combination with the Device Data Monitor programming tool (e.g., Device Data Monitor 11) of the wireless device.

Figure 10:
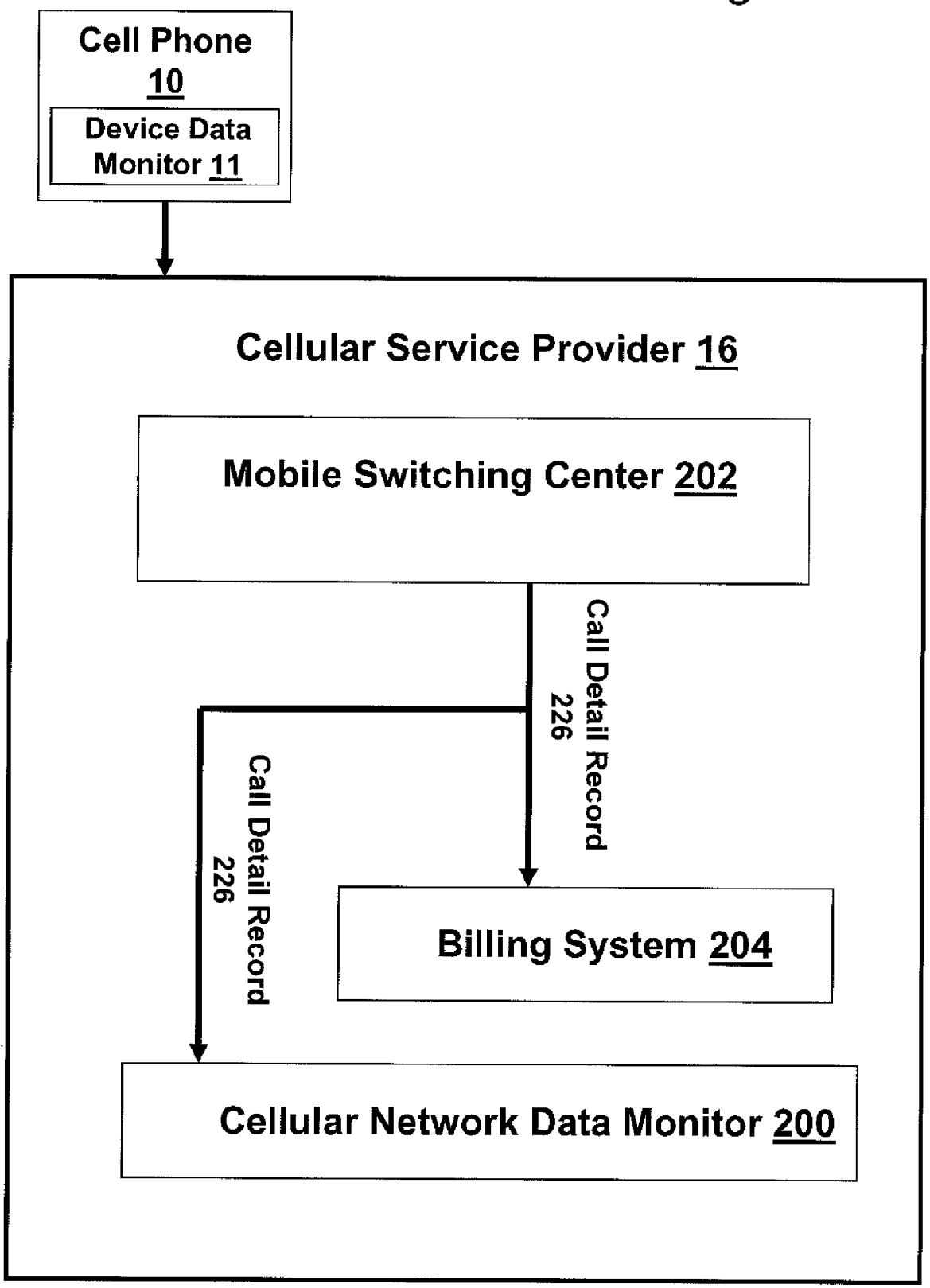
FIG. 10 is a block diagram as an example of a specific system illustrating a monitoring tool associated with a mobile communications device and/or the carrier network in accordance with an embodiment of the present invention.

FIG. 10 is a block diagram as an example of a specific system illustrating monitoring tools associated with a mobile communications device and/or the carrier network in accordance with an embodiment of the present invention. Specifically, FIG. 10 illustrates an example implementation of Network Data Monitor 200 within the network of Cellular Service Provider 16 to monitor data services use for one or more wireless devices (e.g., such as wireless device 10, which optionally may include Device Data Monitor 11).

Cellular Service Provider 16 includes a Mobile Switching Center 202, a Billing System 204, and Network Data Monitor 200. All telephone and SMS is routed through Mobile Switching Center 202 that generates a Call Detail Record (CDR) 226 associated with supporting the communication (e.g., switching or routing the telephone call or data packet (e.g., SMS message)) of wireless device 10. The Call Detail Record 226 (e.g., CDR packet) may then be provided to Billing System 204 of Cellular Service Provider 16 for billing purposes, as would be understood by one skilled in the art. The Call Detail Record 226 may also be provided to Network Data Monitor 200 (e.g., by providing a copy of the Call Detail Record 226 (e.g., CDR packet) via a switch splitter or port spanning (e.g., at the hardware layer)).

Network Data Monitor 200 may then use the Call Detail Record 226 to monitor the data services use of wireless devices (e.g., wireless device 10) using Cellular Service Provider 16 and to provide the information on the data services use to Data Center 17 to perform the various functions as discussed herein (e.g., in reference to FIGS. 1-8). Consequently, for one or more embodiments, the data services use monitoring techniques disclosed herein may be performed solely by Network Data Monitor 200, solely by Device Data Monitoring program tool 11 (if present), and/or by the combination of Network Data Monitor 200 and Device Data Monitoring program tool associated with the particular wireless device (e.g., wireless device 10 with Device Data Monitoring program tool 11) utilizing Cellular Service Provider 16.

Figure 11:
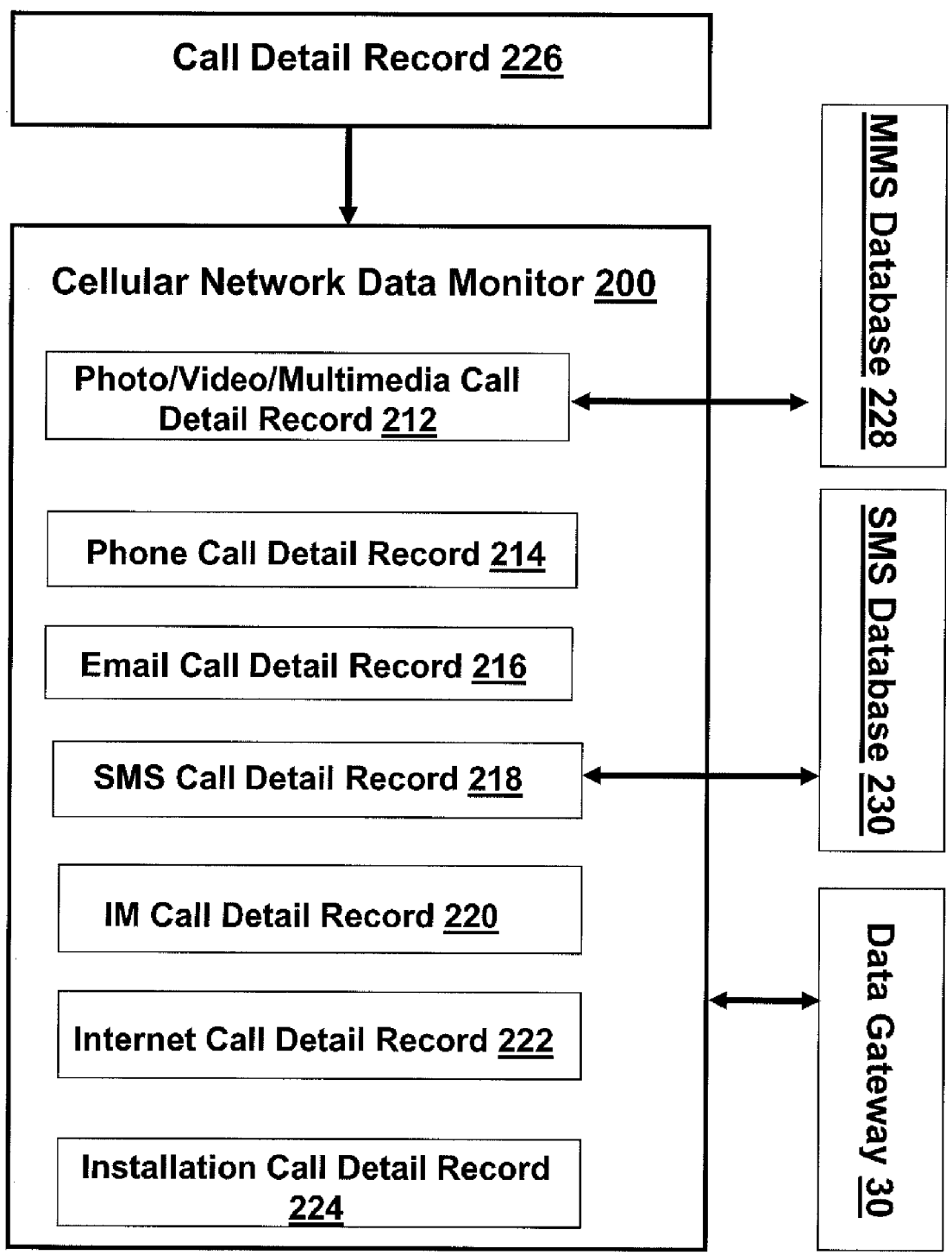
FIGS. 11 and 12 are block diagrams as examples of specific systems illustrating a monitoring tool associated with a mobile communications device and/or the carrier network in accordance with one or more embodiments of the present invention.
Figure 12:
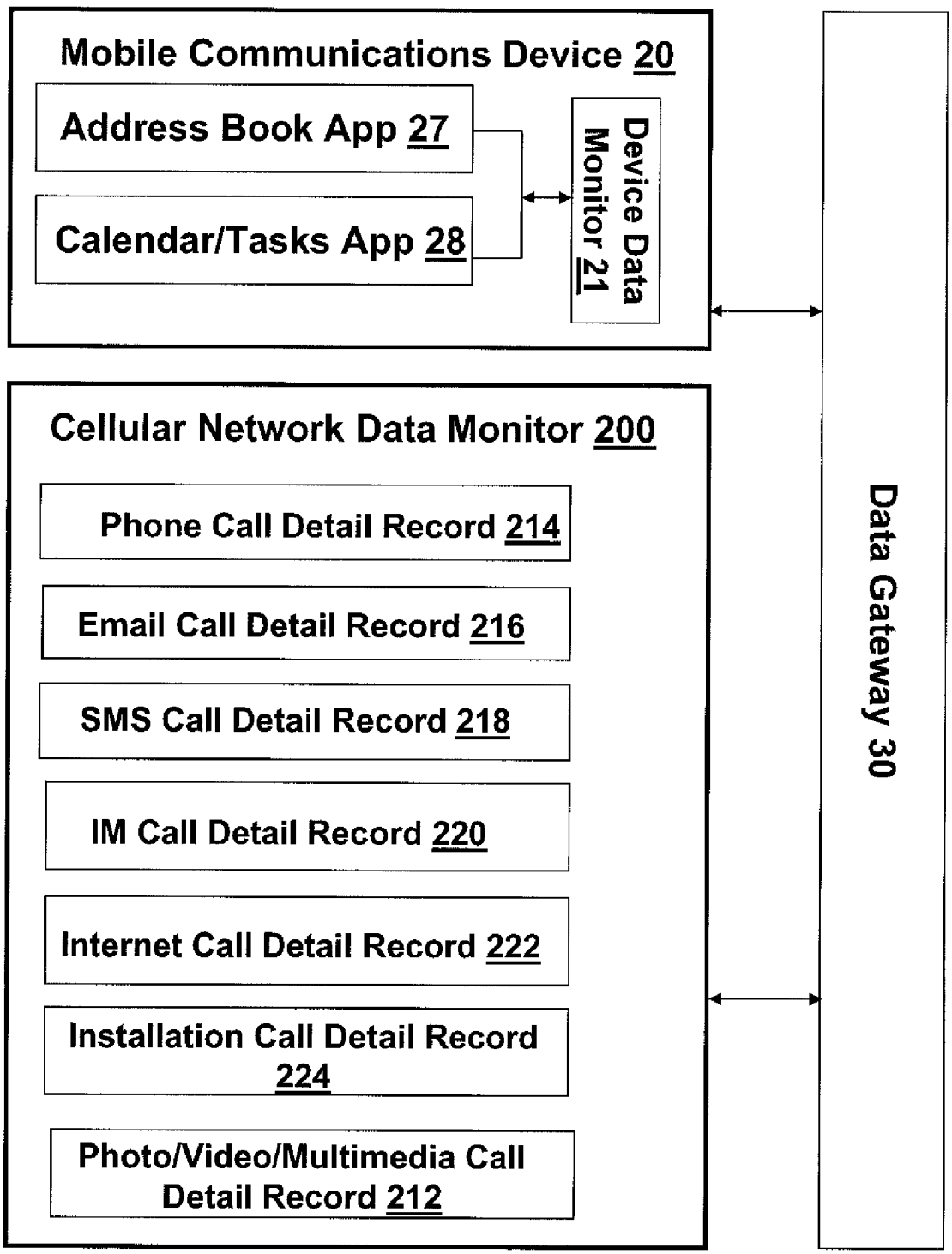

FIGS. 11 and 12 are block diagrams as examples of specific systems illustrating monitoring tools associated with a mobile communications device and/or the carrier network in accordance with one or more embodiments of the present invention. As a specific example for an embodiment, FIG. 11 illustrates Network Data Monitor 200 used to extract various data services use information from Call Detail Record 226.

As shown in FIG. 11, Network Data Monitor 200 may monitor and compile information on various data service uses, such as for example with respect to photos, videos, and multimedia (e.g., Photo/Video/Multimedia Call Detail Record 212), telephone calls (e.g., Phone Cal Detail Record 214), email (Email Call Detail Record 216), SMS communications (e.g., SMS Call Detail Record 218), IM communications (e.g., IM Call Detail Record 220), Internet use (e.g., Internet Call Detail Record 222), and/or application installations (modifications, deletions, additions, e.g. Installation Call Detail Record 224). In general, Network Data Monitor 200 may monitor various data service uses to obtain the desired information for each wireless device in a similar fashion as described in reference to FIG. 2 for Data Monitor 21 (for the various examples of data service uses, such as Phone Application 22 through Photo/Video/Multimedia 31).

Depending upon the desired application and specific implementation, prior to providing the data service use information to Data Center 17 (e.g., via Data Gateway 30), Network Data Monitor 200 may be able to extract all of the data service use information desired directly from Call Detail Record 226 or may utilize various databases as required to obtain the desired data service use information (e.g., such as when the source information is being received or transferred from within the carrier network rather than directly from the wireless device, as would be understood by one skilled in the art).

For example, for Photo/Video/Multimedia Call Detail Record 212, Network Data Monitor 200 may utilize an MMS Database 228 (e.g., of Cellular Service Provider 16) to obtain the desired data service use information associated with an MMS payload. As another example, for SMS Call Detail Record 218, Network Data Monitor 200 may utilize an SMS Database 230 (of Cellular Service Provider 16) to obtain the desired data service use information associated with an SMS payload. As another example, for address book, calendar, or task applications, the data services use may be monitored by Network Data Monitor 200 via Call Detail Record 226 if the associated wireless device synchronizes with the corresponding address book, calendar, or task database (e.g., as described in reference to FIGS. 3J-3L).

As another specific example for an embodiment, FIG. 12 illustrates Network Data Monitor 200 and Device Data Monitor 21 used in combination to extract various data services use information (e.g., associated with wireless device 20). As shown for example, Network Data Monitor 200 functions in a similar fashion as described in reference to FIG. 11 to obtain from Call Detail Record 226 (and various databases as needed, such as for MMS or SMS information) various data services use information to provide to Data Gateway 30. Additionally as an example, Device Data Monitor 21 within wireless device 20 functions in a similar fashion as described in reference to FIG. 2 to monitor wireless device 20 and provide various data services use information (e.g., Address Book Application 27 and Calendar/Task Application 28) to Data Gateway 30. The data services use information provided by Network Data Monitor 200 and Device Data Monitor 21 to Data Center 17 (e.g., via Data Gateway 30) may be utilized as described further herein (e.g., in reference to FIGS. 1-8).

In accordance with one or more embodiments of the present invention, the monitoring of the data services usage of a wireless device (e.g., a mobile communications device) may further provide certain benefits to a user (or owner) of the mobile device. For example, as discussed herein, the monitoring of various data services use may include monitoring access to information associated with various data services. Therefore, a user's privacy may be protected by monitoring attempts to access information associated with various data services and block access to the information if it violates a rule (e.g., as set forth in Permissions database 50 and for example as described in reference to FIGS. 4-7B).

As a specific example, if an application within the wireless device (e.g., wireless device 20) attempts to gain access to privileged user information and/or services without the user providing permission, the attempt to gain access may be blocked. For example, a particular application may attempt to access the user's telephone book, address book, email records, or Internet use history without authorization, which may be blocked or the user notified by implementing the techniques disclosed herein. Specifically, the monitoring of this particular data service use (e.g., by Device Data monitor 21 and/or Network Data Monitor 200) may allow the unauthorized access attempt to privileged user information to be blocked using the techniques disclosed herein (e.g., as discussed in reference to FIGS. 5 and 6B) and/or to alert the user of the unauthorized activity (e.g., as discussed in reference to FIGS. 7A-7B).

As discussed herein (e.g., in reference to FIG. 5), the particular rules within Permission database 50 that govern access and other data services use rights may be set by one or more entities (e.g., an administrator, such as the user, parent/guardian of the user, and/or owner/employer) as appropriate for the specific implementation associated with the wireless device. For example, the administrator may set various rules via the wireless device (e.g., by providing an appropriate password) and/or via a web user interface or by various conventional techniques, as would be understood by one skilled in the art. Furthermore, the rules may be applied to one or more wireless devices under an administrator's control (e.g., a family policy of rules or corporate rules applied to a number of wireless devices).

In general (e.g., in reference to FIG. 12), Device Data Monitor 21 may be used to capture the data service activity on a Mobile Communications Device 20 and Network Data Monitor 200 (e.g., Cellular Network Data Monitor) may be used to capture the data service activity originated or sent to a Mobile Communications Device 20 via the Cellular Service Provider 16 in accordance with an embodiment of the present invention. As discussed herein, alternatively or in combination with Device Data Monitor 21, Network Data Monitor 200 monitors the inbound and outbound activity for each of the data services captured at the Cellular Service Provider 16 and sends a detailed log of these activities to a central repository using Cellular Service Provider 16. Network Data Monitor 200 (e.g., Network Data Monitor 200 program tool) may send the activity information through any available communications network, such as for example the Internet, a company network, and/or a public cellular network.

As would be understood by one skilled in the art, embodiments of the present invention provide certain advantages over conventional approaches. For example, a conventional approach may simply provide parental controls, which monitor and block Internet and email access from a Smartphone (i.e., having similar capabilities to a desktop computer) and which primarily prevent access to unwanted content or block the transmission of personally identifiable information. However, a traditional cell phone (i.e., non-Smartphone) may not provide access to vital mobile communication device services such as phone and SMS logs or may contain other limitations inherent to the operating system of these older legacy-type of phones.

In contrast to these conventional approaches and limitations, in accordance with one or more embodiments, Network Data Monitor 200 would augment (or overcome) these limitations by capturing the data at the Cellular Service Provider 16. For example, most legacy cell phones allow the user to send and receive text messages, but the contextual information related to the text message transmission is stored in a Call Detail Record used by the Cellular Service Provider to route the message through its internal network for billing and eventual delivery to the intended recipient. Both the legacy phone as well as the internal carrier network can provide the SMS service, but do not inherently include parental controls.

As another example of a conventional approach, child and employee monitoring of geographic location may be provided from a cell phone, but this approach typically requires an active search by the parent or manager to locate the device. Perimeter boundaries or virtual fencing could be deployed using existing location technology, but in combination with other data services activity, a much more refined forensic alert system can be deployed.

For example, an employee being in the file room may be within the parameters of the virtual fence. Furthermore, taking a picture from a cell phone may be an acceptable activity in accordance with corporate acceptable use policies. However, taking a picture while located within the file room may be reason for concern, especially if followed by sending the picture to a non-corporate destination, which may require immediate attention by internal security personnel.

For example, the GPS information may be provided by Device Data Monitor 21 to Data Center 17, where it is stored in activity log 40, and an alert provided to the administrator if the Mobile Communications Device 20 enters a restricted area or proceeds outside of a defined geographic region. In general, Device Data Monitor 21 provides various information to Data Center 17 to permit an administrator (e.g., parent or manager) to monitor the activities (e.g., location, communications with a third party, and/or changes to applications or other data within Mobile Communications Device 20) of a user of Mobile Communications Device 20, with an optional alert provided to the administrator if an unauthorized activity occurs.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system, comprising:
   a service provider configured to provide a network to support communications for a plurality of mobile communications devices; and
   a network data monitor associated with the service provider and configured to monitor communications of the plurality of mobile communications devices communicating through the service provider and generate monitoring information to provide to a data center, the monitoring information including information on data services uses of the mobile communications devices;
   wherein the data services uses, for data services associated with each mobile communications device, comprise:
   inbound and outbound communications of the mobile communications device;
   one or more additions, modifications, and/or deletions within the mobile communication device of applications; and
   one or more additions, modifications, and/or deletions within the mobile communication device to application data, wherein the network data monitor comprises an alert monitor program configured to determine whether at least one of the data service uses is allowed based at least in part on whether an identity that is in communication with at least one of the mobile communications devices and associated with the at least one of the data service uses is found in a database.

2. The system of claim 1, wherein the network data monitor comprises:
   a memory configured to store programs and data, including the monitoring information;
   a processor, coupled to the memory, configured to run the programs stored in the memory;
   a communications port configured to communicate with the data center directly or via the service provider; and
   wherein the network data monitor comprises one or more of the programs stored in the memory, and wherein the monitoring information includes contextual information associated with the data services uses.

3. The system of claim 1, wherein the service provider comprises:
   a mobile switching center configured to generate call detail record information associated with the communications of each mobile communications device; and
   wherein the network data monitor uses the call detail record information to monitor communications of the plurality of mobile communications devices and to generate the monitoring information.

4. The system of claim 1, wherein the data services uses comprise a phone application and/or a short message service text application, and wherein the monitoring information comprises:
   telephone call information for the phone application data service use, including associated originating or destination telephone number and contextual data;
   messages information for the short message service text application data service use, including associated telephone number along with contextual data; and
   wherein the contextual information comprises any combination of text, files, pictures, and audio information associated with the data services uses.

5. The system of claim 4, wherein the data services uses comprise an email application, an instant messaging application, a web browser application, an installation application, and/or a multimedia application; and
   wherein the monitoring information comprises:
   email information for the email application data service use, including email address, date/time stamp, and contextual data;
   instant messaging information for the instant messaging application data service use, including username, date/time stamp, and contextual data;
   web browser information for the web browser application data service use, including date/time stamp, uniform resource locator, and contextual data;
   installation application information for the installation application data service use, including date/time stamp and contextual data associated with the installation application addition, modification, and/or deletion; and
   multimedia application information for the multimedia application data service use, including date/time stamp and contextual data associated with the multimedia application addition, modification, and/or deletion.

6. The system of claim 5, wherein the network data monitor is configured to access a multimedia messaging service database to obtain the multimedia application information and is configured to access a short message service database to obtain the messages information.

7. The system of claim 1, wherein the data services uses, for data services associated with each mobile communications device, comprise any attempt by an application to access privileged user information within the mobile communications device and wherein the database comprises at least one of an address book database and a permissions database.

8. The system of claim 1, further comprising the plurality of mobile communications devices, wherein each mobile communications device comprises:
- a first memory configured to store mobile programs and mobile data;
- a first processor, coupled to the first memory, configured to run the mobile programs stored in the first memory;
- a first communications port configured to wirelessly communicate with the data center via the service provider; and
- wherein the mobile programs comprise a data monitor program configured to:
- monitor data services uses of the mobile communications device;
- compile information, including contextual information, of the data services uses; and
- transmit the information to the data center via the communications port and the service provider;
- wherein the information comprises:
- address book information for an address book application data service use, including date/time stamp and contextual data associated with the address book addition, modification, and/or deletion;
- calendar information for a calendar application data service use, including date/time stamp and contextual data associated with the calendar addition, modification, and/or deletion; and/or
- task information for a task application data service use, including date/time stamp and contextual data associated with the task addition, modification, and/or deletion.

9. A system, comprising:
a data center, comprising:
- a memory configured to store programs and database information;
- a processor, coupled to the memory, configured to access the database information and run the programs;
- a communication gateway, coupled to the processor, configured via a service provider to receive information, including contextual information, on data services uses of mobile communications devices, being monitored by the data center, the service provider having a network data monitor configured to:
- monitor each data service use for each mobile communications device;
- compile the monitoring information associated with each data service use for each mobile communications device; and
- provide the monitoring information associated with each data service use for each mobile communications device to be received by the communication gateway;
- wherein the data services uses, for data services associated with the mobile communications device, comprise:
- inbound and outbound communications of the mobile communications device; and
- one or more additions, modifications, and/or deletions within the mobile communications device to application data, wherein the information associated with the data services uses comprise message information for a message application data service use, including at least one of associated originating or destination email address, username, or telephone number along with contextual data;
- wherein the database information comprises:
- an activity log database configured to store an entry for each data service use based on the monitoring information, including contextual information, received from the mobile communications device; and
- a permissions database configured to store rules as to whether each data service use is allowed for the mobile communications device; and
- wherein the programs comprise:
- an alert monitor program configured to compare the entry for each data service use stored in the activity log database to the associated rule stored in the permissions database and to provide an alert if the data service use of the mobile communications device is not allowed, wherein the alert monitor program determines whether at least one of the data service uses is allowed based at least in part on whether an identity that is in communication with at least one of the mobile communications devices and associated with the at least one of the data service uses is found in a database.

10. The system of claim 9, wherein each mobile communications device comprises:
- a first memory configured to store mobile programs and mobile data;
- a first processor, coupled to the first memory, configured to run the mobile programs stored in the first memory;
- a first communications port configured to wirelessly communicate with the data center via the service provider; and
- wherein the mobile programs comprise a data monitor program configured to:
- monitor data services uses of the mobile communications device;
- compile information, including contextual information, of the data services uses; and
- transmit the information to the data center via the communications port and the service provider;
- wherein the information comprises:
- address book information for an address book application data service use, including date/time stamp and contextual data associated with the address book addition, modification, and/or deletion;
- calendar information for a calendar application data service use, including date/time stamp and contextual data associated with the calendar addition, modification, and/or deletion; and/or
- task information for a task application data service use, including date/time stamp and contextual data associated with the task addition, modification, and/or deletion.

11. The system of claim 9, wherein the data services uses further comprise any addition, modification, and/or deletion within the mobile communications device of an application, and wherein the monitoring information comprises:
- telephone call information for a phone application data service use, including associated originating or destination telephone number and contextual data; and
- changes to application data information for at least one of an address book or a calendar along with contextual data.

12. The system of claim 9, wherein the data services uses, for data services associated with each mobile communications device, comprise any attempt by an application to access privileged user information within the mobile communications device, and wherein the data services associated with the mobile communications device comprise a location determination application.

13. The system of claim 12, wherein an alert is provided if the data service use attempted is not permitted in a location of the mobile communications device; and
 wherein the programs further comprise a data gateway program tool configured to route the information on the data service use received from the mobile communications device being monitored to the memory and to route the alert from the alert monitor program to a designated external device.

14. The system of claim 9, wherein the data services associated with the mobile communications device comprise a phone application and a short message service text application;
 wherein the alert monitor program is configured to analyze the contextual information along with an associated telephone number, email address, or username to determine if the data service use for the mobile communications device is not allowed; and
 wherein the information includes identification of the mobile communications device along with a date and time associated with the data service use.

15. The system of claim 9, wherein the database information further comprises:
 an address book database, wherein the address book database is configured to store address book information of the mobile communications device; and a calendar database configured to store calendar information of the mobile communications device.

16. The system of claim 9, wherein the data center monitors communications to and from each mobile communications device by analyzing the monitoring information on the data services uses to detect unauthorized activity, and wherein the data center further provides web-based access to the database information for an administrator to review the monitoring information on the data services uses of the mobile communications device and modify the corresponding rules.

17. The system of claim 9, wherein the alert is provided to the mobile communications device to prevent the data service use that is not allowed based on the rules stored in the permissions database.

18. A mobile communications device, comprising:
 a first memory configured to store mobile programs and mobile data;
 a first processor, coupled to the first memory, configured to run the mobile programs stored in the first memory;
 a first communications port configured to wirelessly communicate with a data center via a service provider; and
 wherein the mobile programs comprise a data monitor program configured to:
 monitor data services uses of the mobile communications device;
 compile information, including contextual information, of the data services uses; and
 transmit the information to the data center via the communications port and the service provider;
 wherein the information comprises:
 address book information for an address book application data service use, including date/time stamp and contextual data associated with the address book addition, modification, and/or deletion;
 calendar information for a calendar application data service use, including date/time stamp and contextual data associated with the calendar addition, modification, and/or deletion; and/or
 task information for a task application data service use, including date/time stamp and contextual data associated with the task addition, modification, and/or deletion, wherein the data monitor program comprises an alert monitor program configured to determine whether at least one of the data service uses is allowed based at least in part on whether an identity that is in communication with at least one of the mobile communications devices and associated with the at least one of the data service uses is found in a database.

19. The mobile communications device of claim 18, wherein the database comprises at least one of an address book database and a permissions database.

20. A method of monitoring a mobile communications device communicating via a service provider, the method comprising:
 storing rules associated with data services uses for the mobile communications device at a data center, wherein the data services uses, for data services associated with the mobile communications device, comprise:
 inbound and outbound communications of the mobile communications device;
 any additions, modifications, and/or deletions within the mobile communications device to applications; and
 any additions, modifications, and/or deletions within the mobile communications device to application data;
 receiving monitoring information, including the corresponding contextual information, for one of the data services uses of the mobile communications device, the monitoring information generated by a network data monitor associated with the service provider;
 storing the monitoring information for the data service use;
 checking the data service use based on the monitoring information to the corresponding rule associated with the data service use, wherein the checking is based at least in part on whether an identity that is in communication with the mobile communications device and associated with the data service use is an authorized entry within a database associated with the mobile communications device; and
 providing an alert if the data service use is unauthorized based on the corresponding rule.

21. The method of claim 20, further comprising providing the alert to the mobile communications device to prevent the data service use that is unauthorized and/or providing the alert to an administrator to notify of the data service use that is unauthorized;
 wherein the data services uses comprise a phone application use, a short message service text application use, an email application use, an instant messaging application use, a multimedia application use, and a web browser application use; and
 wherein the contextual information includes any combination of text, message content, files, pictures, and audio information associated with the data services uses.

22. The method of claim 20, further comprising:
 receiving monitoring information, including the corresponding contextual information, for one of the data services uses of the mobile communications device, from the mobile communications device;
 wherein the monitoring information from the mobile communications device is generated by a data monitor program within the mobile communications device, wherein the monitoring information generated by the data monitor program comprises:
 address book information for an address book application data service use, including date/time stamp and contextual data associated with the address book addition, modification, and/or deletion;

calendar information for a calendar application data service use, including date/time stamp and contextual data associated with the calendar addition, modification, and/or deletion; and/or task information for a task application data service use, including date/time stamp and contextual data associated with the task addition, modification, and/or deletion.

23. The method of claim 22, wherein the monitoring information generated by the data monitor program comprises any attempt by an application to access privileged user information within the mobile communications device.

* * * * *